US011805460B2

(12) United States Patent
Ozturk et al.

(10) Patent No.: US 11,805,460 B2
(45) Date of Patent: *Oct. 31, 2023

(54) DUAL LINK HANDOVER

(71) Applicant: QUALCOMM Incorporated, San Diego, CA (US)

(72) Inventors: Ozcan Ozturk, San Diego, CA (US); Jun Wang, Poway, CA (US); Ravindra Manohar Patwardhan, San Diego, CA (US); Abhijit Khobare, San Diego, CA (US); Ajay Gupta, San Diego, CA (US); Madhavan Srinivasan Vajapeyam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 316 days.

This patent is subject to a terminal disclaimer.

(21) Appl. No.: 17/118,291

(22) Filed: Dec. 10, 2020

(65) Prior Publication Data

US 2021/0099935 A1 Apr. 1, 2021

Related U.S. Application Data

(63) Continuation of application No. 16/262,189, filed on Jan. 30, 2019, now Pat. No. 10,869,241, which is a
(Continued)

(51) Int. Cl.
*H04W 36/08* (2009.01)
*H04W 36/02* (2009.01)
(Continued)

(52) U.S. Cl.
CPC ......... *H04W 36/08* (2013.01); *H04W 36/026* (2013.01); *H04W 74/0833* (2013.01);
(Continued)

(58) Field of Classification Search
CPC ... H04W 36/08; H04W 36/026; H04W 36/18; H04W 76/20; H04W 76/30; H04W 74/0833
See application file for complete search history.

(56) References Cited

U.S. PATENT DOCUMENTS 8,270,369 B1 * 9/2012 Chang .................. H04L 1/1607
370/332
9,060,316 B2 6/2015 Kitazoe
(Continued)

FOREIGN PATENT DOCUMENTS

CN 102045793 A 5/2011
CN 102340886 A 2/2012
(Continued)

OTHER PUBLICATIONS

LG Electronics Inc. (Rapporteur): "Report of E-mail Discussion on MAC-RRC Interaction on MAC Reset and Configuration", 3GPP TSG-RAN WG2 #64, R2-086338, No. Prague, Czech Republic, Nov. 10, 2008-Nov. 14, 2008, 7 Pages.
(Continued)

*Primary Examiner* — Jenee Holland
(74) *Attorney, Agent, or Firm* — Dalei Dong; Holland & Hart LLP

(57) ABSTRACT

Methods, systems, and devices for wireless communication are described. A user equipment (UE) may receive data from both a source base station and a target base station during handover. For example, the UE may refrain from resetting or reestablishing media access control (MAC) and packet data convergence protocol (PDCP) layer configurations until after a successful access procedure is performed with the target base station. In some cases, a single radio link control (RLC)/PDCP stack may be used during handover procedures. A source base station may, for example, forward data to a target base station after receiving a handover execution
(Continued)

message. A UE may identify and resolve any duplicate data sent by both base stations during the transition. Additional signaling may be used (e.g., during the radio resource control (RRC) configuration) to indicate that a UE supports dual link handover.

30 Claims, 17 Drawing Sheets

Related U.S. Application Data continuation of application No. 15/012,062, filed on Feb. 1, 2016, now Pat. No. 10,244,444.

(60) Provisional application No. 62/128,094, filed on Mar. 4, 2015.

(51) Int. Cl.
H04W 74/08 (2009.01)
H04W 76/30 (2018.01)
H04W 36/18 (2009.01)
H04W 36/00 (2009.01)
H04W 76/20 (2018.01)

(52) U.S. Cl.
CPC ........... *H04W 76/20* (2018.02); *H04W 76/30* (2018.02); *H04W 36/18* (2013.01)

(56) References Cited

U.S. PATENT DOCUMENTS

| | | | |
|---|---|---|---|
| 9,191,810 B2* | 11/2015 | Kuo | H04W 12/03 |
| 10,244,444 B2 | 3/2019 | Ozturk et al. | |
| 2001/0011018 A1 | 8/2001 | Baum et al. | |
| 2003/0013452 A1 | 1/2003 | Hunt et al. | |
| 2004/0208160 A1 | 10/2004 | Petrovic et al. | |
| 2006/0068789 A1 | 3/2006 | Vannithamby et al. | |
| 2006/0068793 A1 | 3/2006 | Van et al. | |
| 2006/0153110 A1 | 7/2006 | Morgan et al. | |
| 2007/0010250 A1 | 1/2007 | Bosch et al. | |
| 2007/0049209 A1* | 3/2007 | Usuda | H04W 28/22 455/69 |
| 2007/0161374 A1 | 7/2007 | Kienstra, III et al. | |
| 2008/0014991 A1 | 1/2008 | Laroia et al. | |
| 2008/0069088 A1 | 3/2008 | Petrovic et al. | |
| 2008/0076432 A1 | 3/2008 | Senarath et al. | |
| 2008/0159204 A1 | 7/2008 | Qi et al. | |
| 2008/0159417 A1 | 7/2008 | Yin et al. | |
| 2008/0176577 A1 | 7/2008 | Bourlas et al. | |
| 2008/0188224 A1 | 8/2008 | Pani et al. | |
| 2008/0268844 A1 | 10/2008 | Ma et al. | |
| 2008/0310367 A1 | 12/2008 | Meylan | |
| 2009/0040982 A1 | 2/2009 | Ho et al. | |
| 2009/0059892 A1 | 3/2009 | Marinier et al. | |
| 2009/0124259 A1 | 5/2009 | Attar et al. | |
| 2009/0190554 A1 | 7/2009 | Cho | |
| 2009/0197606 A1 | 8/2009 | Bergman et al. | |
| 2009/0239538 A1 | 9/2009 | Motegi et al. | |
| 2009/0268645 A1 | 10/2009 | Chindapol et al. | |
| 2010/0234037 A1 | 9/2010 | Terry et al. | |
| 2010/0238900 A1 | 9/2010 | Johansson et al. | |
| 2010/0254348 A1 | 10/2010 | Prakash et al. | |
| 2010/0260096 A1 | 10/2010 | Ulupinar et al. | |
| 2011/0002304 A1 | 1/2011 | Lee et al. | |
| 2011/0019643 A1 | 1/2011 | Kim et al. | |
| 2011/0149813 A1 | 6/2011 | Parkvall et al. | |
| 2011/0176461 A1 | 7/2011 | Astely et al. | |
| 2011/0194433 A1 | 8/2011 | Song et al. | |
| 2011/0269464 A1 | 11/2011 | Xu et al. | |
| 2012/0134338 A1 | 5/2012 | Ko et al. | |
| 2012/0135736 A1 | 5/2012 | Sebire et al. | |
| 2012/0218973 A1 | 8/2012 | Du et al. | |
| 2012/0230295 A1 | 9/2012 | Chin et al. | |
| 2012/0327821 A1 | 12/2012 | Lin et al. | |
| 2012/0329501 A1 | 12/2012 | Balck et al. | |
| 2013/0016604 A1 | 1/2013 | Ko et al. | |
| 2013/0021991 A1 | 1/2013 | Ko et al. | |
| 2013/0084873 A1 | 4/2013 | Sharony et al. | |
| 2013/0176933 A1* | 7/2013 | Seo | H04J 11/0056 370/312 |
| 2013/0201904 A1 | 8/2013 | Toskala et al. | |
| 2013/0201960 A1* | 8/2013 | Kim | H04W 72/0446 370/336 |
| 2013/0229971 A1 | 9/2013 | Siomina et al. | |
| 2013/0242880 A1 | 9/2013 | Miao et al. | |
| 2013/0260762 A1 | 10/2013 | Tomita et al. | |
| 2013/0297810 A1 | 11/2013 | Ho et al. | |
| 2013/0322235 A1 | 12/2013 | Khoryaev et al. | |
| 2013/0336294 A1* | 12/2013 | Dinan | H04W 52/0219 370/336 |
| 2013/0343297 A1* | 12/2013 | Dinan | H04W 72/23 370/329 |
| 2013/0343345 A1* | 12/2013 | Dinan | H04L 5/0007 370/332 |
| 2014/0003301 A1 | 1/2014 | Madan et al. | |
| 2014/0003327 A1 | 1/2014 | Seo et al. | |
| 2014/0078941 A1 | 3/2014 | Seo et al. | |
| 2014/0092785 A1 | 4/2014 | Song et al. | |
| 2014/0148169 A1 | 5/2014 | Li et al. | |
| 2014/0198734 A1 | 7/2014 | Yamada et al. | |
| 2014/0211756 A1* | 7/2014 | Bontu | H04W 36/04 370/331 |
| 2014/0247742 A1* | 9/2014 | Lee | H04W 24/10 370/252 |
| 2014/0256311 A1 | 9/2014 | Müller et al. | |
| 2014/0269459 A1 | 9/2014 | Fan et al. | |
| 2014/0286240 A1* | 9/2014 | Kim | H04L 5/001 370/328 |
| 2014/0286276 A1 | 9/2014 | Lunttila et al. | |
| 2014/0293896 A1 | 10/2014 | Kuo | |
| 2014/0293897 A1 | 10/2014 | Kuo et al. | |
| 2014/0295868 A1 | 10/2014 | Lee | |
| 2014/0321263 A1 | 10/2014 | Wu | |
| 2015/0043492 A1 | 2/2015 | Baek et al. | |
| 2015/0045035 A1 | 2/2015 | Nigam et al. | |
| 2015/0055621 A1 | 2/2015 | Koskinen | |
| 2015/0146688 A1 | 5/2015 | Yasuda et al. | |
| 2015/0245402 A1 | 8/2015 | Mochizuki et al. | |
| 2015/0271763 A1 | 9/2015 | Balachandran et al. | |
| 2015/0289144 A1 | 10/2015 | Yi et al. | |
| 2015/0304925 A1 | 10/2015 | Hwang et al. | |
| 2016/0192261 A1 | 6/2016 | Wang et al. | |
| 2016/0262066 A1 | 9/2016 | Ozturk et al. | |
| 2016/0337848 A1 | 11/2016 | Chang et al. | |
| 2019/0166531 A1 | 5/2019 | Ozturk et al. | |

FOREIGN PATENT DOCUMENTS

| | | |
|---|---|---|
| CN | 104244349 A | 12/2014 |
| EP | 2073590 A1 | 6/2009 |
| WO | WO-2008086460 | 7/2008 |
| WO | WO-2009021214 | 2/2009 |
| WO | WO-2011059524 | 5/2011 |
| WO | WO-2014112783 A1 | 7/2014 |
| WO | WO-2014163349 A1 | 10/2014 |
| WO | WO-2014174242 A1 | 10/2014 |
| WO | WO-2015009075 A1 | 1/2015 |
| WO | WO-2015115621 A1 | 8/2015 |
| WO | WO-2015115629 A1 | 8/2015 |
| WO | WO-2015115817 A1 | 8/2015 |
| WO | WO-2015184889 A1 | 12/2015 |

OTHER PUBLICATIONS

Taiwan Search Report—TW109116125—TIPO—dated Jul. 8, 2021.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 11)", 3GPP TS 36.300 V11.12.0 (Dec. 2014), 210 Pages.

(56) References Cited

OTHER PUBLICATIONS

"3rd Generation Partnership Project; TechnicalSpecification Group Radio Access Network; Radio Resource Control (RRC);Protocol specification (Release 11)", V11.12.0, 3rd Generation Partnership Project (3GPP), Mobile Competence Centre ; 650, route des Lucioles F-06921 Sophia-Antipolis Cedex ; France, ;3GPP Standard; 3GPP TS 25.331, Dec. 19, 2014, XP050927369, 2106 pages.
Broadcom Corporation: "Mobility Robustness with Dual Connectivity", 3GPP TSG-RAN WG2 Meeting #83-BIS, R2-133531, Ljubljana, Slovenia, Oct. 7-11, 2013, 6 Pages, Sep. 27, 2013.
International Preliminary Report on Patentability—PCT/US2016/016162, The International Bureau of WIPO—Geneva, Switzerland, Sep. 5, 2017.
International Search Report and Written Opinion—PCT/US2016/016162—ISA/EPO—dated Apr. 18, 2016.
Samsung: "Introduction of Dual Connectivity", 3GPP DRAFT; R2-144664, 3GPP TSG RAN WG2 #87bis, 36331_CR0xxx_(REL-12)_R2-144664_Introducing DualConnectivity-v05, Oct. 28, 2014 3rd Generation Partnership Project (3GPP), Mobile Competence Centre ; 650, Route des Lucioles ; F-06921 Sophia-Antipolis Cedex ; France, vol. RAN WG2, Nr: Shanghai, P.R. China;Oct. 6, 2014-Oct. 10, 2014, Oct. 28, 2014, XP050886258, 82 pages.
Samsung: "Introduction of Dual Connectivity", R2-140596, 3GPP TSG-RAN WG2 Meeting #85, Prague, Czech Republic, Feb. 10-14, 2014, Jan. 2, 2014, 31 Pages.
Taiwan Search Report—TW105103397—TIPO—dated Sep. 12, 2019.

\* cited by examiner

DUAL LINK HANDOVER

CROSS REFERENCES

The present application for patent is a Continuation of U.S. patent application Ser. No. 16/262,189 entitled "Dual Link Handover" filed Jan. 30, 2019, which is a Continuation application of U.S. patent application Ser. No. 15/012,062, entitled "Dual Link Handover" filed Feb. 1, 2016, which claims priority to U.S. Provisional Patent Application No. 62/128,094 entitled "Dual Link Handover," filed Mar. 4, 2015, assigned to the assignee hereof, and expressly incorporated by reference herein.

BACKGROUND

The following relates generally to wireless communication, and more specifically to dual link handover. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE may be transferred from one serving base station to another. The UE may terminate its connection with the source base station prior to establishing a new connection with the target base station. This may result in a delay which may disrupt the user's communications.

SUMMARY

Methods, systems, and devices that support dual link handover are described. A UE within a wireless communications system may receive a connection reconfiguration message associated with a handover procedure, and the UE may continue to receive data transmissions from a source base station after receiving the connection reconfiguration message and prior to undertaking or completing the handover. For instance, the UE may perform a successful access procedure with a target base station after receiving the connection reconfiguration message; and the UE may delay resetting or reestablishing some configurations—e.g., medium access control (MAC), packet data convergence protocol (PDCP), radio link control (RLC), etc.—until completing the successful access procedure.

A method of wireless communication is described. The method may include receiving a connection reconfiguration message associated with a handover from a source base station to a target base station, receiving a data transmission from the source base station after receiving the connection reconfiguration message, performing an access procedure with the target base station based at least in part on the connection reconfiguration message, and resetting a MAC configuration, resetting an RLC configuration, or reestablishing a PDCP configuration, or any combination thereof, based at least in part on a successful access procedure.

An apparatus for wireless communication is described. The apparatus may include means for receiving a connection reconfiguration message associated with a handover from a source base station to a target base station, means for receiving a data transmission from the source base station after receiving the connection reconfiguration message, means for performing an access procedure with the target base station based at least in part on the connection reconfiguration message, and means for resetting a MAC configuration, resetting an RLC configuration, or reestablishing a PDCP configuration, or any combination thereof, based at least in part on a successful access procedure.

A further apparatus for wireless communication is described. The apparatus may include a processor, memory in electronic communication with the processor, and instructions stored in the memory and operable, when executed by the processor, to cause the apparatus to receive a connection reconfiguration message associated with a handover from a source base station to a target base station, receive a data transmission from the source base station after receiving the connection reconfiguration message, perform an access procedure with the target base station based at least in part on the connection reconfiguration message, and reset a MAC configuration, reset an RLC configuration, or reestablish a PDCP configuration, or any combination thereof, based at least in part on a successful access procedure.

A non-transitory computer-readable medium storing code for wireless communication is described. The code may include instructions executable to receive a connection reconfiguration message associated with a handover from a source base station to a target base station, receive a data transmission from the source base station after receiving the connection reconfiguration message, perform an access procedure with the target base station based at least in part on the connection reconfiguration message, and reset a MAC configuration, reset an RLC configuration, or reestablish a PDCP configuration, or any combination thereof, based at least in part on a successful access procedure.

Some examples of the method, apparatuses, or non-transitory computer-readable medium described herein may further include processes, features, means, or instructions for transmitting an indication of a dual link handover capability to the source base station, wherein the data transmission is received in response to the indication. Additionally or alternatively, in some examples the dual link handover capability is associated with a low latency capability.

Some examples of the method, apparatuses, or non-transitory computer-readable medium described herein may further include processes, features, means, or instructions for receiving a subsequent data transmission from the target base station based at least in part on the reset MAC configuration, the reset RLC configuration, the reestablished PDCP configuration, or any combination thereof. Additionally or alternatively, in some examples the data transmission and the subsequent data transmission use a same RLC/PDCP stack.

Some examples of the method, apparatuses, or non-transitory computer-readable medium described herein may further include processes, features, means, or instructions for receiving a second data transmission from the target base station prior to resetting the MAC configuration, resetting the RLC configuration, or reestablishing the PDCP configuration, or any combination thereof. Additionally or alternatively, in some examples the second data transmission is a base station ciphered transmission.

In some examples of the method, apparatuses, or non-transitory computer-readable medium described herein, the second data transmission corresponds to a same logical channel as the data transmission from the source base station. Additionally or alternatively, some examples may include processes, features, means, or instructions for suppressing a radio link monitoring (RLM) procedure based at least in part on receiving the connection reconfiguration message.

Some examples of the method, apparatuses, or non-transitory computer-readable medium described herein may further include processes, features, means, or instructions for resuming an RLM procedure with the source base station based at least in part on determining that the access procedure was unsuccessful. Additionally or alternatively, some examples may include processes, features, means, or instructions for resuming an RLM procedure with the target base station based at least in part on determining that the access procedure was successful.

Some examples of the method, apparatuses, or non-transitory computer-readable medium described herein may further include processes, features, means, or instructions for purging the connection reconfiguration message based at least in part on determining that the access procedure was unsuccessful and continuing communication with the source base station. In some examples of the method, apparatuses, or non-transitory computer-readable medium described herein, determining that the access procedure was successful comprises receiving a contention resolution message from the target base station.

A method of wireless communication is described. The method may include sending a connection reconfiguration message associated with a handover of a wireless device to a target base station, sending a data transmission to the wireless device after sending the connection reconfiguration message, and receiving a handover execution message from the target base station after the wireless device performs a successful access procedure for the target base station.

An apparatus for wireless communication is described. The apparatus may include means for sending a connection reconfiguration message associated with a handover of a wireless device to a target base station, means for sending a data transmission to the wireless device after sending the connection reconfiguration message, and means for receiving a handover execution message from the target base station after the wireless device performs a successful access procedure for the target base station.

A further apparatus for wireless communication is described. The apparatus may include a processor, memory in electronic communication with the processor, and instructions stored in the memory and operable, when executed by the processor, to cause the apparatus to send a connection reconfiguration message associated with a handover of a wireless device to a target base station, send a data transmission to the wireless device after sending the connection reconfiguration message, and receive a handover execution message from the target base station after the wireless device performs a successful access procedure for the target base station.

A non-transitory computer-readable medium storing code for wireless communication is described. The code may include instructions executable to send a connection reconfiguration message associated with a handover of a wireless device to a target base station, send a data transmission to the wireless device after sending the connection reconfiguration message, and receive a handover execution message from the target base station after the wireless device performs a successful access procedure for the target base station.

Some examples of the method, apparatuses, or non-transitory computer-readable medium described herein may further include processes, features, means, or instructions for receiving an indication of a dual link handover capability from the wireless device, wherein the data transmission is sent based at least in part on the indication. Additionally or alternatively, in some examples the dual link handover capability is associated with a low latency capability. Some examples of the method, apparatuses, or non-transitory computer-readable medium described herein may further include processes, features, means, or instructions for stopping transmission to the wireless device in response to receiving the handover execution message.

Some examples of the method, apparatuses, or non-transitory computer-readable medium described herein may further include processes, features, means, or instructions for sending the indication of the dual link handover capability to the target base station. Additionally or alternatively, some examples may include processes, features, means, or instructions for transmitting a sequence number (SN) status transfer message or a bearer data message to the target base station in response to the handover execution message.

A method of wireless communication is described. The method may include receiving an indication of a dual link handover capability from a wireless device, determining that a target base station does not support dual link handover, and refraining from transmission of a connection reconfiguration message associated with a handover of the wireless device to the target base station based at least in part on the determination that the target base station does not support dual link handover.

An apparatus for wireless communication is described. The apparatus may include means for receiving an indication of a dual link handover capability from a wireless device, determining that a target base station does not support dual link handover, and refraining from transmission of a connection reconfiguration message associated with a handover of the wireless device to the target base station, based at least in part on the determination.

A further apparatus for wireless communication is described. The apparatus may include a processor, memory in electronic communication with the processor, and instructions stored in the memory and operable, when executed by the processor, to cause the apparatus to receive an indication of a dual link handover capability from a wireless device, determine that a target base station does not support dual link handover, and refrain from transmission of a connection reconfiguration message associated with a handover of the wireless device to the target base station based at least in part on the determination.

A non-transitory computer-readable medium storing code for wireless communication is described. The code may include instructions executable to receive an indication of a dual link handover capability from a wireless device, determine that a target base station does not support dual link handover, and refrain from transmission of a connection reconfiguration message associated with a handover of the wireless device to the target base station, based at least in part on the determination.

A method of wireless communication is described. The method may include receiving a handover prepare request from a source base station, receiving an access request from a wireless device, receiving a connection reconfiguration complete message from the wireless device based at least in part on the access request, and transmitting a handover execution message to the source base station based at least in part on the connection reconfiguration complete message.

An apparatus for wireless communication is described. The apparatus may include means for receiving a handover prepare request from a source base station, means for receiving an access request from a wireless device, means for receiving a connection reconfiguration complete message from the wireless device based at least in part on the access request, and means for transmitting a handover execution message to the source base station based at least in part on the connection reconfiguration complete message.

A further apparatus for wireless communication is described. The apparatus may include a processor, memory in electronic communication with the processor, and instructions stored in the memory and operable, when executed by the processor, to cause the apparatus to receive a handover prepare request from a source base station, receive an access request from a wireless device, receive a connection reconfiguration complete message from the wireless device based at least in part on the access request, and transmit a handover execution message to the source base station based at least in part on the connection reconfiguration complete message.

A non-transitory computer-readable medium storing code for wireless communication is described. The code may include instructions executable to receive a handover prepare request from a source base station, receive an access request from a wireless device, receive a connection reconfiguration complete message from the wireless device based at least in part on the access request, and transmit a handover execution message to the source base station based at least in part on the connection reconfiguration complete message.

Some examples of the method, apparatuses, or non-transitory computer-readable medium described herein may further include processes, features, means, or instructions for receiving an indication of a dual link handover capability from the source base station, wherein the data transmission is sent in response to the indication. Additionally or alternatively, in some examples the dual link handover capability is associated with a low latency capability. Some examples of the method, apparatuses, or non-transitory computer-readable medium described herein may further include processes, features, means, or instructions for sending a source base station ciphered transmission to the wireless device prior to receiving the connection reconfiguration complete message.

Some examples of the method, apparatuses, or non-transitory computer-readable medium described herein may further include processes, features, means, or instructions for receiving a sequence number (SN) status transfer message or a bearer data message from the source base station in response to the handover execution message. Additionally or alternatively, some examples may include processes, features, means, or instructions for sending a data transmission to the wireless device based at least in part on receiving the SN status transfer message or the bearer data message.

BRIEF DESCRIPTION OF THE DRAWINGS

The nature of the present disclosure may be understood by reference to the following drawings.

DETAILED DESCRIPTION

Some wireless systems may employ a "break-and-make" handover procedure, where a connection to a source base station is terminated prior to establishing a new connection to the target base station. According to the present disclosure, a user equipment (UE) within some systems may, in some cases, utilize a "make-before-brake" handover procedure. This may be referred to as dual link handover. In such cases, a UE may receive data from both a source base station and a target base station during handover. For example, the UE may refrain from resetting or reestablishing media access control (MAC) and packet data convergence protocol (PDCP) layer configurations until after a successful access procedure is performed with the target base station. In some cases, a single radio link control (RLC)/PDCP stack may be used during the handover procedures. The source base station may, in some examples, forward data to the target base station after receiving a handover execution message. The UE may identify and resolve any duplicate data sent by both base stations during the transition. In some cases, additional signaling may be used (e.g., during the radio resource control (RRC) configuration) to indicate the UEs dual link handover capability. The source base station may relay this information to the target base station in order to facilitate dual link handover.

Figure 1:
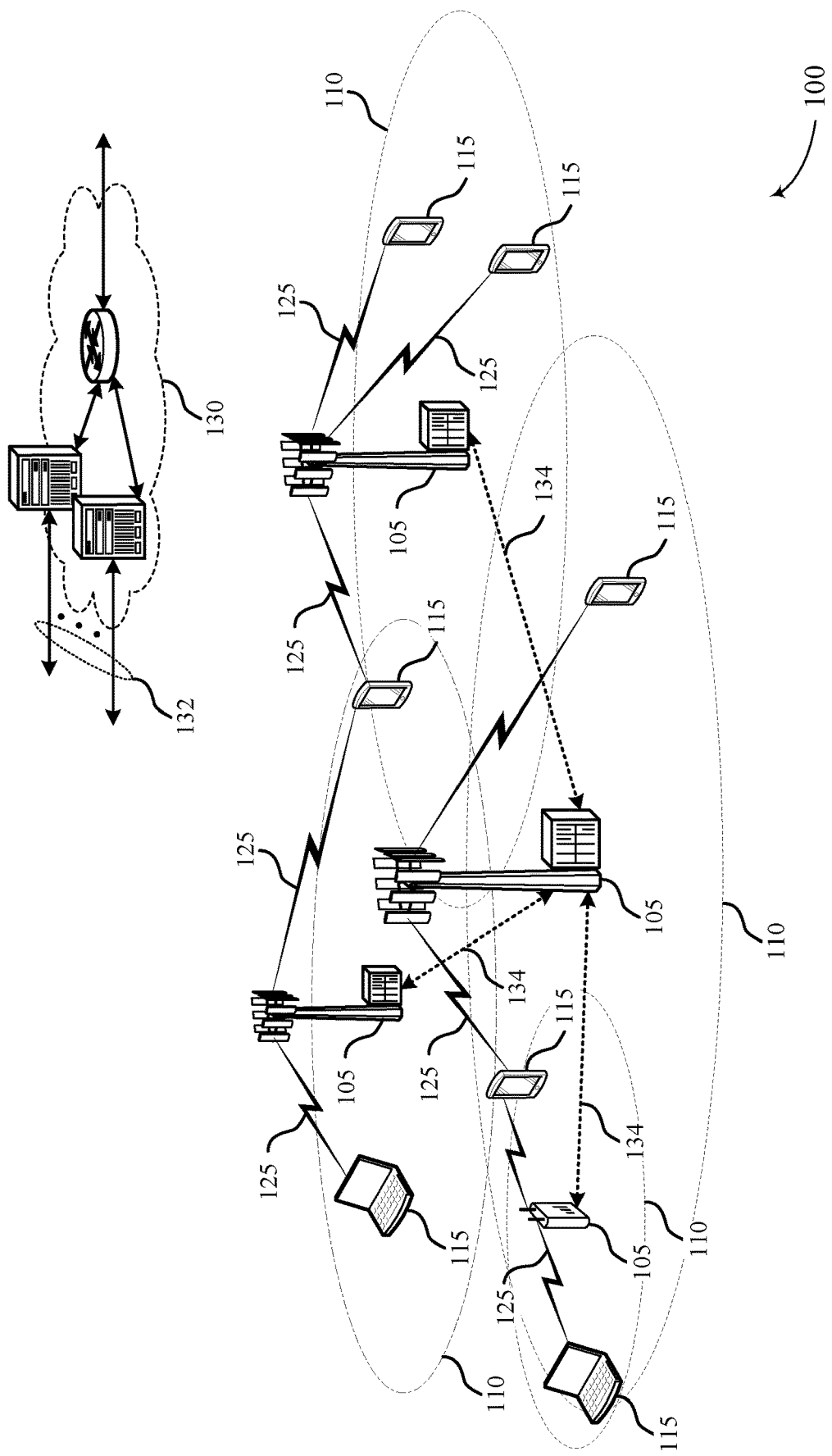
FIG. 1 illustrates an example of a wireless communications system that supports dual link handover in accordance with various aspects of the present disclosure.

FIG. 1 illustrates an example of a wireless communications system 100 that supports dual link handover in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support, and may communicate with one another to support, dual link handover. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations may be referred to as eNodeBs 105 or eNBs 105, in some examples.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. The UEs 115 may communicate with base stations 105, and may support dual link handover.

The core network 130 may provide user authentication, access authorization, tracking, internet protocol (IP) connectivity, and other access, routing, or mobility functions. Core network 130 may include components such as a mobility management entity (MME), a serving gateway (S-GW), and a packet gateway (P-GW).

The MME within the core network 130 may be involved in the network connection activation/deactivation process and may also be involved in authenticating a user in coordination with a Home Subscriber Server (HSS). Non Access Stratum (NAS) signaling—which may be used for the establishment of communication sessions and for maintaining continuous communications with UEs 115 as they move—may be initiated or directed at the MME. In some examples, the MME may support or facilitate dual link handover, as described below. The MME may also allocate a temporary identity to a UE 115. For example, the MME may allocate a globally unique temporary identity (GUTI) to a UE 115 that includes identification information for the MME as well as a temporary identity for the UE 115. A GUTI may minimize the frequency with which a persistent identity, e.g., an international mobile subscriber identity (IMSI), is transmitted within the network. The MME may also check whether a UE 115 is authorized to camp on a service provider's public land mobile network (PLMN), and may manage security keys for NAS signaling such as attachment procedures for UEs 115 and handles the security key management.

The functions of the S-GW may include establishing bearers based on direction from the MME, routing and forwarding user data packets to a P-GW, connecting to a S-GW in a PLMN, user plane tunneling (e.g., using a general packet radio service (GPRS) tunneling protocol), anchoring for LTE mobility, and gathering user and bearer information. The functions of the P-GW may include connecting to external data networks, managing inter S-GW handovers, coordinating policy, rules and charging functions, and anchoring the evolved packet switched system (EPS) bearer. In some examples, the S-GW or the P-GW, or both, may support dual link handover, as described below.

Wireless communications system 100 may be a packet-based network that operates according to a layered protocol stack. Data may be divided into logical channels, transport channels, and physical layer channels. Transport channels may be mapped to physical channels at the physical (PHY) layer. Channels may also be classified into control channels and traffic channels. Moreover, the radio protocol architecture of wireless communications system 100 may be divided, generally, into a control plane and a user plan.

In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. A packet data convergence protocol (PDCP) layer may be responsible for header compression and decompression of IP data flows using the robust header compression (ROHC) protocol, transfer of data (user plane or control plane), maintenance of PDCP sequence numbers (SNs), and in-sequence delivery of upper layer protocol data units (PDUs) to lower layers. The PDCP layer may also manage elimination of duplicate packets, ciphering and deciphering of user plane data and control plane data, integrity protection and integrity verification of control plane data, and packet discard based on a timer-out timer. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency.

The RLC layer may connect higher layers (e.g., RRC and PDCP) to the lower layers (e.g., the MAC layer). If, for instance, an incoming data packet (e.g., a PDCP or RRC service data unit (SDU)) is too big for transmission, the RLC layer may segment it into several smaller RLC PDUs. Alternatively, if incoming packets are too small, the RLC layer may concatenate several of them into a single, larger RLC PDU. Each RLC PDU may include a header including information about how to reassemble the data. The RLC layer may also help ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDUs have been received and the receiver may respond with a status report. Unlike the MAC layer HARQ, RLC automatic repeat request (ARQ) may not include a forward error correction function. In some examples, UEs 115 may reset MAC, PDCP, or RLC configurations in conjunction with a handover procedure.

In order to initiate communications with wireless communications system 100, a UE 115 may receive synchronization signals, a master information block (MIB) and one or more system information blocks (SIBs). The UE 115 may then may transmit a random access channel (RACH) preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an UL resource grant, a timing advance, and a temporary cell radio network temporary identity (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

A UE 115 may determine that a radio link has failed by performing radio link monitoring (RLM) measurements. If a link fails, the UE 115 may initiate a radio link failure (RLF) procedure. For example, an RLF procedure may be triggered upon an RLC indication that a maximum number of retransmissions has been reached, upon receiving a maximum number of RLM out-of-sync indications, or upon radio failure during a RACH procedure. In some cases (e.g., after reaching the limit for out-of-sync indications), a UE 115 may initiate a timer and wait to determine whether a threshold number of in-sync indications are received. If the number of in-sync indications exceeds the threshold prior to expiration of the timer, the UE 115 may abort the RLF procedure. Otherwise, the UE 115 may perform a RACH procedure to regain access to network. The RACH procedure may include transmitting an RRC connection re-establishment request including the C-RNTI, the cell identification (ID), security verification information, and a cause for re-establishment. The base station 105 receiving the request may respond with either an RRC connection re-establishment message or an RRC connection re-establishment rejection. The RRC connection re-establishment message may contain parameters for establishing a signaling radio bearer (SRB) for the UE 115 as well as information for generating a security key. Once the UE 115 receives the RRC connection establishment message it may implement the new SRB configuration and transmit an RRC connection re-establishment complete message to the base station 105.

In some cases, a UE 115 may be transferred from a serving base station 105 (which may be referred to as a source base station) to another base station 105 (which may be referred to as a target base station). For example, the UE 115 may be moving into the coverage area of the target base station 105, or the target base station 105 may be capable of providing better service for the UE 115 or relieving the source base station 105 of excess load. The transition may be referred to as a "handover." Prior to a handover, the source base station 105 may configure the UE 115 with procedures for measuring the signal quality of neighboring base stations 105. The UE 115 may then respond with a measurement report. The source base station 105 may use the measurement report to make the handover decision. The decision may also be based on radio resource management (RRM) factors such as network load and interference mitigation.

When the handover decision is made, the source base station 105 may send a handover request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a handover request acknowledge message to the source base station 105, which may include RRC information to be passed on to the UE 115. The source base station 105 may then direct the UE 115 to perform the handover, and pass a status transfer message to the target base station with PDCP bearer status information. The UE 115 may attach to the target base station 105 via a RACH procedure.

As mentioned above, some handover procedures may be based on "break-and-make" signaling. That is, the connection to a source base station 105 may be broken before the connection to the target base station 105 is created. This may cause a disruption of data between the "break" and the "make." In other examples, however, a UE 115 may be connected to both the source and target cells, thus having a dual link, during handover. In some cases, a UE 115 may currently receive data on multiple cells (e.g., using different physical downlink control channels (PDCCHs) and physical downlink shared channels (PDSCHs)) either in carrier aggregation (CA) or dual connectivity (DC) mode. In some examples, there may be a single RRC connection. Thus, during a handover the UE 115 may receive a command to reconfigure the RRC, but may remain connected to the serving base station 105 until a new connection may be made with the target base station 105.

Figure 2:
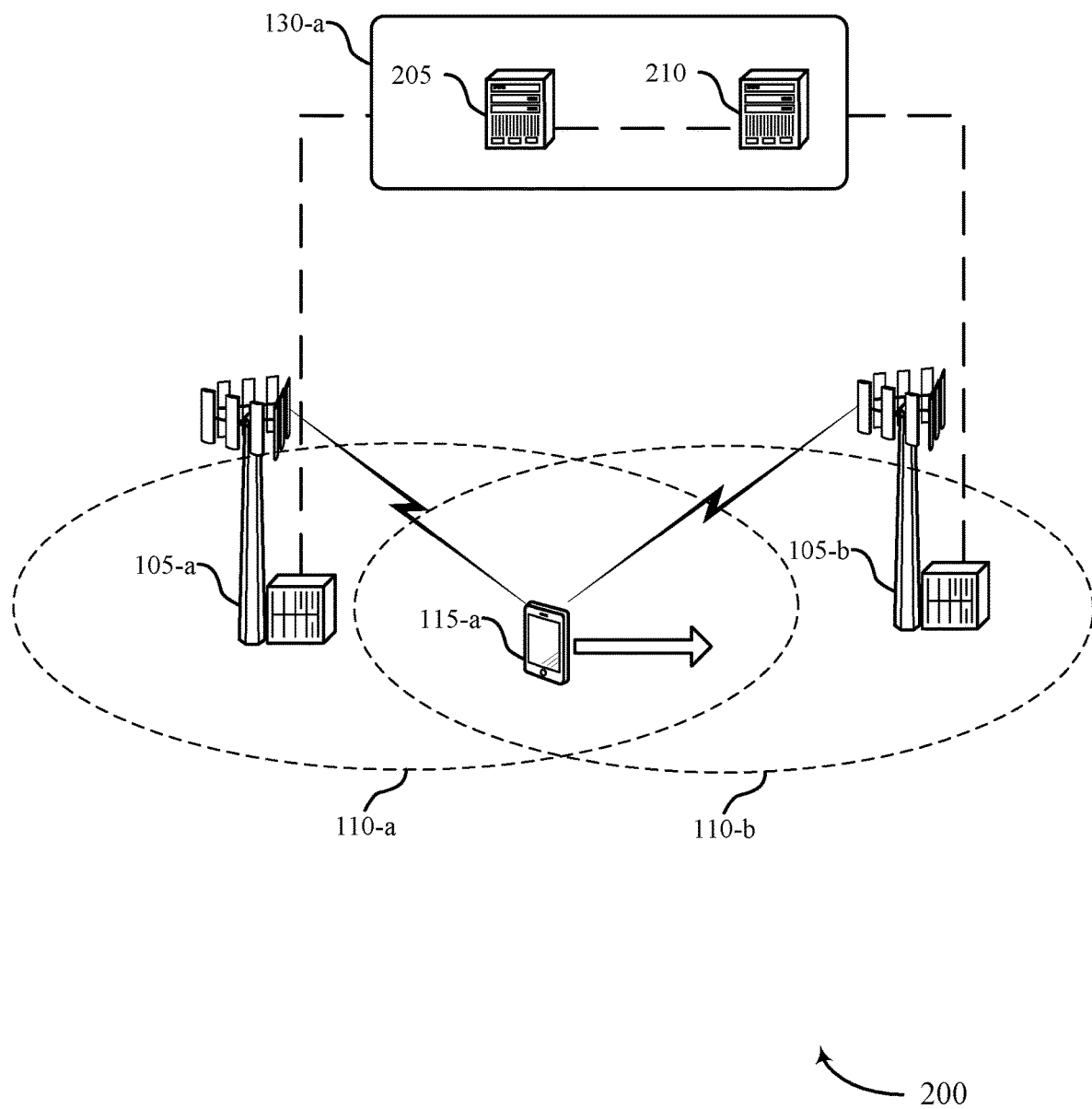
FIG. 2 illustrates an example of a wireless communications system that supports dual link handover in accordance with various aspects of the present disclosure.

FIG. 2 illustrates an example of a wireless communications system 200 that supports dual link handover in accordance with various aspects of the present disclosure. Wireless communications system 200 may include UE 115-a, source base station 105-a and target base station 105-b, which may be examples of a UE 115 or base stations 105 described herein and with reference to FIG. 1. Wireless communications system 200 may include core network 130-a, which may include MME 205 and S-GW 210, which may be examples of the network components described herein and with reference to FIG. 1.

UE 115-a may undergo a dual-link handover procedure from source base station 105-a to target base station 105-b. For example, UE 115-a may be moving from geographic coverage area 110-a to coverage area 110-b. Before the handover, UE 115-a may have a protocol stack configured for communications with source base station 105-a. For example, UE 115-a may have RRC, PDCP, RLC, and MAC layer configurations. UE 115-a may refrain from resetting the MAC configuration or reestablishing the PDCP configuration until after a successful RACH procedure is performed with target base station 105-b. This may enable UE 115-a to continue communicating with source base station 105-a until it is ready to transfer communications to target base station 105-b. During the final stages of the handover, MME 205 and P-GW may transfer an EPS bearer for UE 115-a from the source base station 105-a to the target base station 105-b.

In some cases, a handover mechanism may include three steps: first, source base station 105-a may decide to handover UE 115-a to target base station 105-b and send a handover command including RRC configuration information of the target base station 105-b to UE 115-a; second, UE 115-a may apply the new RRC configuration, reset the MAC configuration and initiate PDCP re-establishment; third, UE 115-a may perform a RACH procedure at target base station 105-b. According to the present disclosure, UE 115-a may continue receiving data and sending HARQ or channel state information (CSI) feedback with source base station 105-a. Although, in some examples, UE 115-a may suspend RLM measurement for the source base station 105-a during the handover. If RACH fails, UE 115-a can return to source base station 105-a (and resume RLM, if appropriate).

In some cases, source base station 105-a may decide not to handover UE 115-a to target base station 105-b. For example, target base station 105-b may indicate to source base station 105-a (e.g., via a backhaul link) that it does not have dual link handover capabilities. Source base station 105-*a* may then refrain from transmitting the handover command based on the indicated capabilities of target base station 105-*b*.

In some cases, a single RLC/PDCP stack may be used by UE 115-*a* during handover procedures. A successful RACH procedure for target base station 105-*b* may be a trigger point to switch RLC/PDCP. This may also trigger target base station 105-*b* to indicate to source base station 105-*a* to stop transmission of data packets. At this point, a PDCP status report can be sent from UE 115-*a* to target base station 105-*a*. In other cases, dual RLC/PDCP may be used and UE 115-*a* may receive data from both cells during handover using different protocol stacks.

Source base station 105-*a* may forward data to target base station 105-*b* after handover. Source base station 105-*a* may, however, continue transmitting PDCP SDUs to UE 115-*a*, and a sequence number status report may be sent to target base station 105-*b* after source base station 105-*a* stops transmitting to UE 115-*a*. If dual RLC/PDCP is used, for example, both ciphered and un-ciphered PDCP PDUs may be forwarded. When marker packets are received by source base station 105-*a*, PDCP PDUs may be forwarded (with or without ciphering). That is, target base station 105-*b* may transmit the source ciphered PDUs until it can take over transmission (i.e., after source base station stops transmitting). UE 115-*a* may monitor both base stations 105 and may receive PDCP PDUs from both base station 105 using the same logical channel. If target base station 105-*b* transmits some of the same PDCP PDUs during transition, duplicates may be received and processed at the UE 115-*a*.

In some cases, additional signaling between UE 115-*a* and source base station 105-*a* may be used to indicate or negotiate the appropriate type of handover. For example, UE 115-*a* may signal that it is capable of participating in a dual link handover; that is, it may be capable of communicating with both base stations 105 during the handover transition period between receiving the handover command from source base station 105-*a* and performing a successful RACH with target base station 105-*b*. The dual link handover capability for both UE 115-*a* and source base station 105-*a* may be exchanged during RRC configuration, and the information may be forwarded to target base station 105-*b* prior to or during the handover.

In some cases, the dual link handover procedure described herein may be associated with a UE 115 that is capable of low latency operations. For example, signaling low latency capability may indicate dual link handover capability, or vice versa. Low latency operations may involve communicating using transmission time intervals (TTIs) that are less than a subframe in length. For example, the TTI may vary from a subframe length to a symbol period length. Use of the dual link handover may complement the reduction in latency associated with a reduced TTI length.

In some cases, UE 115-*a* may resume RLM at the source base station 105-*a* if access at the target base station 105-*b* fails. In some cases, signaling from the target base station 105-*b* to the source base station 105-*a* may be used to inform that UE 115-*a* completed access to the target base station 105-*b*. This may serve to notify the source base station 105-*a* to stop data transmission. In some cases, a forward handover may be used in which UE 115-*a* makes the decision to handover to target base station 105-*b*. In a forward handover or otherwise, UE 115-*a* may not reset the MAC/PDCP configuration until it successfully completes access to the target base station 105-*b*.

Figure 3:
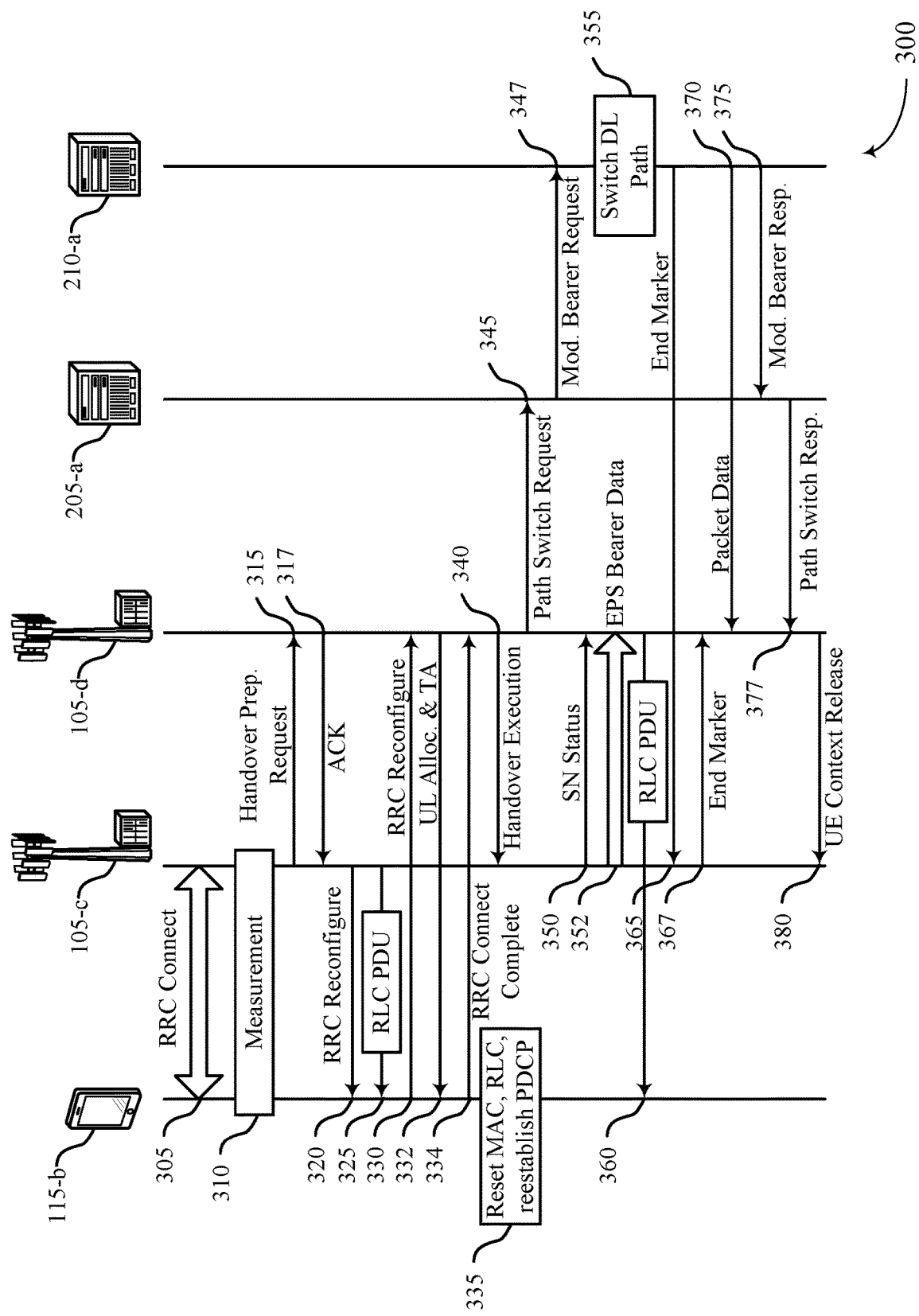
FIG. 3 illustrates an example of a process flow that supports dual link handover in accordance with various aspects of the present disclosure.

FIG. 3 illustrates an example of a process flow 300 for a system that supports dual link handover in accordance with various aspects of the present disclosure. Process flow 300 may include a UE 115-*b*, which may be an example of a UE 115 described herein and with reference to FIGS. 1 and 2. Process flow 300 may also include base stations 105-*c*, 105-*d*, MME 205-*a* and S-GW 210-*a*, which may be examples of network components as described herein and with reference to FIGS. 1-2.

At 305, UE 115-*b* and source base station 105-*c* may establish an RRC configuration. In some cases, UE 115-*b* may transmit an indication of a dual link handover capability to the source base station 105-*c*, and a data transmission may be received based at least in part on the indication. In some examples, the dual link handover capability is associated with a low latency capability.

At 310, UE 115-*b* may and source base station 105-*c* may perform one or more radio link measurements indicating that UE 115-*b* may receive better service by transferring to target base station 105-*d*. At 315, source base station 105-*c* may send a handover preparation request to target base station 105-*d*. At 317, target base station 105-*d* may acknowledge the handover preparation request.

At 320, source base station 105-*c* may transmit a handover command (e.g., an RRC reconfiguration message) to UE 115-*b*. Thus, UE 115-*b* may receive a connection reconfiguration message associated with a handover from source base station 105-*c* to target base station 105-*d*. As used herein, an access procedure may be considered any combination of 305-320 within process flow 300. Further, the UE 115-*b* may determine whether the access procedure is successful or unsuccessful based on the content of the connection reconfiguration message. For example, the connection reconfiguration message may include an information element indicating whether the access procedure was successful. In some cases, UE 115-*b* may suppress an RLM procedure based on receiving the connection reconfiguration message. In some cases, UE 115-*b* may resume an RLM procedure with the source base station based at least in part on determining that an access procedure was unsuccessful. Additionally or alternatively, UE 115-*b* may resume an RLM procedure with the target base station based at least in part on determining that the access procedure was successful. In some cases, UE 115-*b* may purge the connection reconfiguration message based at least in part on determining that an access procedure was unsuccessful, and continue communication with the source base station 105-*c*.

At 325, source base station 105-*c* may continue to send data transmissions (corresponding to RLC PDUs) to UE 115-*b*. UE 115-*b* may therefore receive a data transmission from source base station 105-*c* after receiving the connection reconfiguration message.

At 330, UE 115-*b* may transmit an RRC reconfiguration request (e.g., according to a RACH procedure) to target base station 105-*d*. UE 115-*b* may thus perform a successful access procedure with target base station 105-*d* based on receiving the connection reconfiguration message.

At 332, target base station 105-*d* may transmit configuration information such as UL grant information and timing adjustment information to UE 115-*b*. In some examples, performing a successful access procedure includes receiving a contention resolution message from target base station 105-*d*.

At 334, UE 115-*b* may send a connection reconfiguration message associated with the handover to target base station 105-*d*. In some cases, UE 115-*b* may receive a second data transmission from target base station 105-*d* prior to resetting the MAC configuration, resetting the RLC configuration, or reestablishing the PDCP configuration. In some examples, the second data transmission is a source base station ciphered transmission. In some cases, the source base station ciphered transmission may be forwarded by the source base station 105 to the target base station 105, and then sent to UE 115-*b*. In some cases, the second data transmission corresponds to a same logical channel as the data transmission from the source base station.

At 335, UE 115-*b* may reset MAC and/or RLC configurations, or reestablish a PDCP configuration for communications with target base station 105-*d*. That is, UE 115-*b* may reset a MAC configuration, reset an RLC configuration, or reestablish a PDCP configuration, or any combination thereof, based on the successful access procedure.

At 340, target base station 105-*d* may send a handover execution message to source base station 105-*c*. Thus, source base station 105-*c* may receive a handover execution message from target base station 105-*d* after UE 115-*b* performs a successful access procedure for target base station 105-*d*. Source base station 105-*c* may stop transmitting subsequent messages to UE 115-*b* based on receiving the handover execution message.

At 345, target base station 105-*d* may send a path switch request to MME 205-*a*. At 347, MME 205-*a* may send a modify bearer request to S-GW 210-*a*. At 350, source base station 105-*c* may send a sequence number (SN) status transfer message to target base station 105-*d*. At 352, source base station 105-*c* may send EPS bearer data to target base station 105-*d*. At 355, S-GW 210-*a* may switch a DL path for UE 115-*b* from source base station 105-*c* to target base station 105-*d*.

At 360, target base station 105-*d* may transmit one or more RLC PDUs to UE 115-*b*. Thus, UE 115-*b* may receive a subsequent data transmission from target base station 105-*d* based on the reset MAC configuration, the reset RLC configuration, the reestablished PDCP configuration, or any combination thereof. In some examples, the data transmissions from source base station 105-*c* and the subsequent data transmission from target base station 105-*d* use the same RLC/PDCP stack.

At 365, S-GW 210-*a* may send an end marker to source base station 105-*c*. At 367, source base station 105-*c* may transmit an end marker to target base station 105-*d*. At 370, S-GW 210-*a* may route packet data for UE 115-*b* to target base station 105-*d*. At 375, S-GW 210-*a* may send a modify bearer response to MME 205-*a*. At 377, MME 205-*a* may send a path switch response to target base station 105-*d*. At 380, target base station 105-*d* may transmit a UE context release message to source base station 105-*c*.

Figure 4:
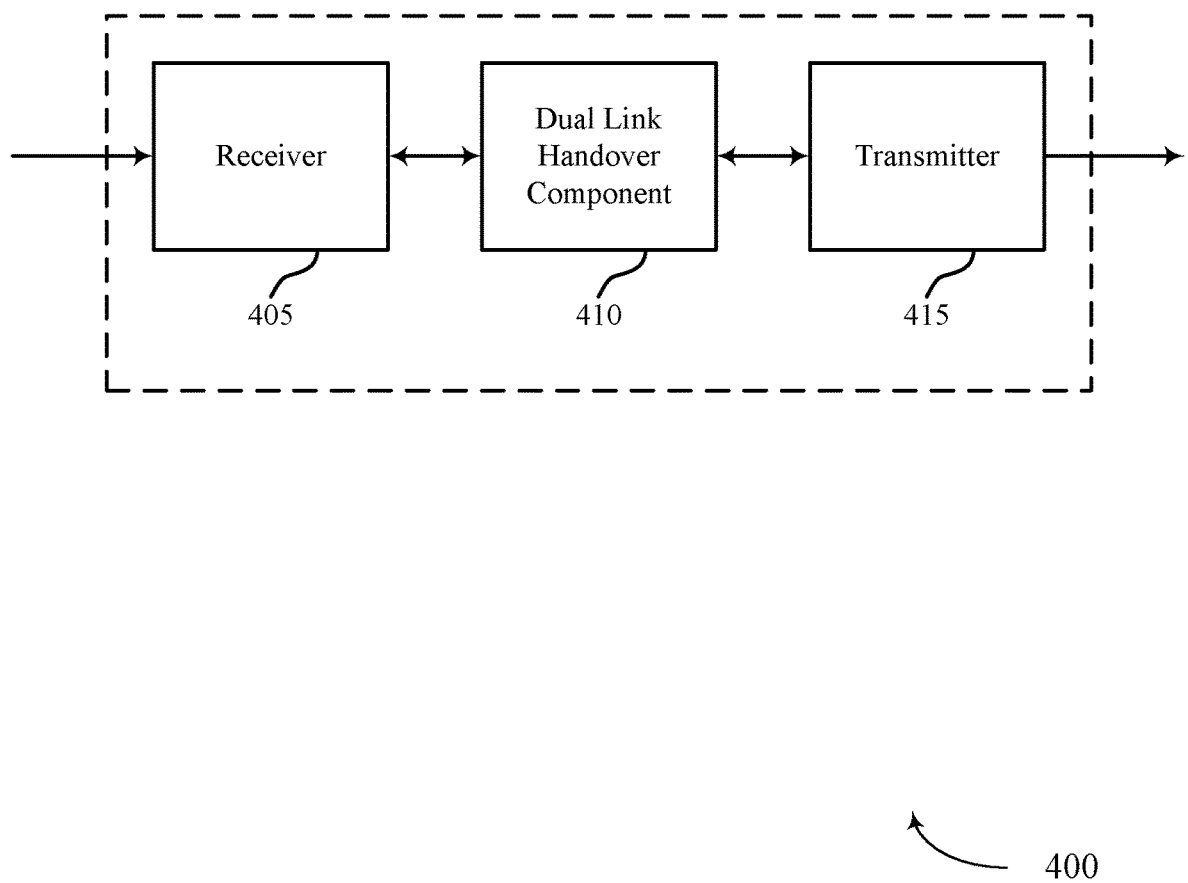
FIGS. 4-6 show block diagrams of a wireless device or devices that supports dual link handover in accordance with various aspects of the present disclosure.

FIG. 4 shows a block diagram of a wireless device 400 that supports dual link handover in accordance with various aspects of the present disclosure. Wireless device 400 may be an example of aspects of a UE 115 described with reference to FIGS. 1-3. Wireless device 400 may include a receiver 405, a dual link handover component 410, or a transmitter 415. Wireless device 400 may also include a processor. Each of these components may be in communication with one another.

The receiver 405 may receive information such as packets, user data, or control information associated with various information channels (e.g., control channels, data channels, and information related to dual link handover, etc.). Information may be passed on to the dual link handover component 410, and to other components of wireless device 400.

The dual link handover component 410 may, e.g., in combination with receiver 405, receive a connection reconfiguration message associated with a handover from a source base station to a target base station, receive a data transmission from the source base station after receiving the connection reconfiguration message, perform a successful access procedure with the target base station based on receiving the connection reconfiguration message, and reset a MAC configuration, a PDCP configuration, or an RLC configuration, based on the successful access procedure.

The transmitter 415 may transmit signals received from other components of wireless device 400. In some examples, the transmitter 415 may be collocated with the receiver 405 in a transceiver component. The transmitter 415 may include a single antenna, or it may include a plurality of antennas.

Figure 5:
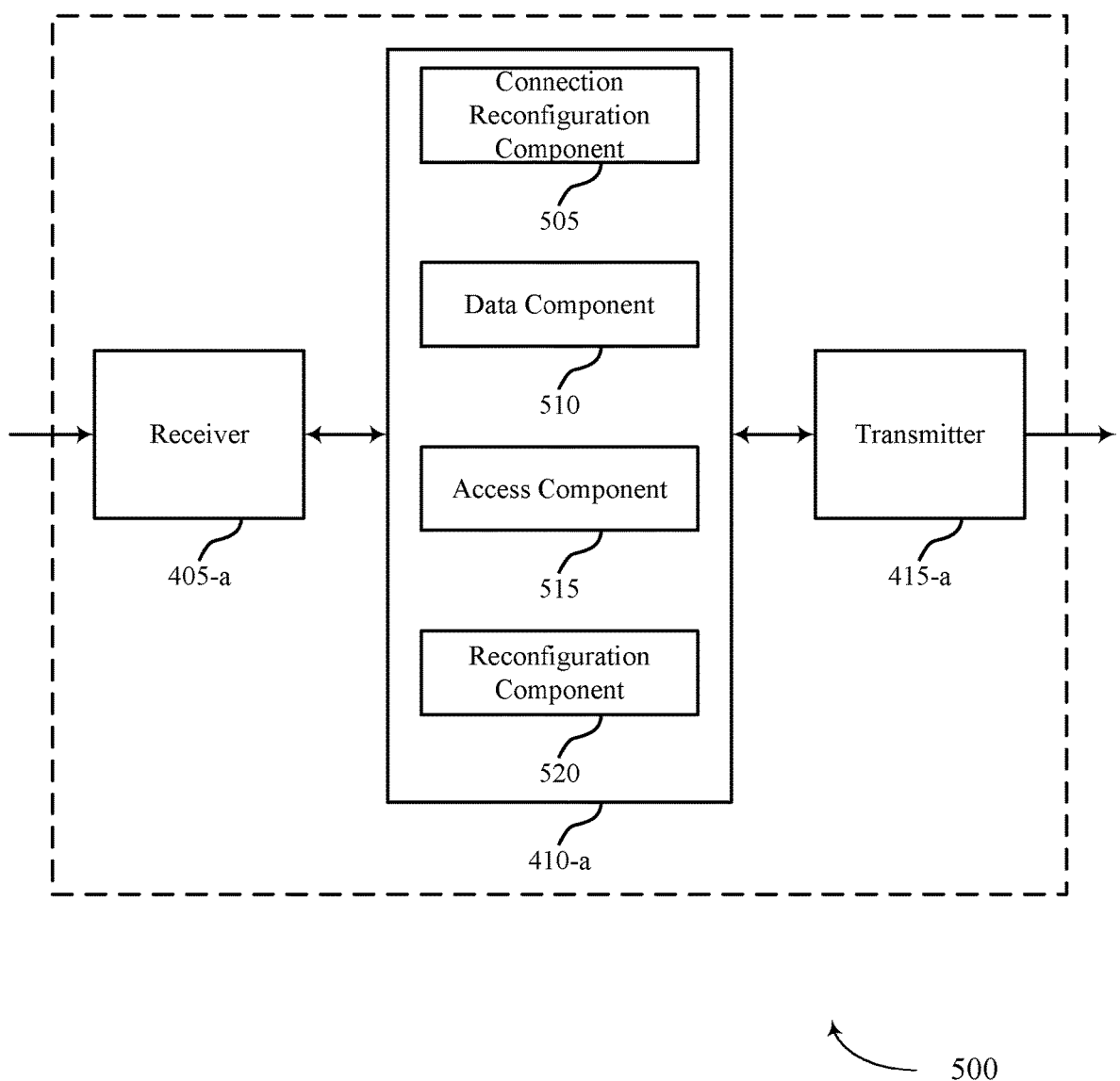

FIG. 5 shows a block diagram of a wireless device 500 that supports dual link handover in accordance with various aspects of the present disclosure. Wireless device 500 may be an example of aspects of a wireless device 400 or a UE 115 described with reference to FIGS. 1-4. Wireless device 500 may include a receiver 405-*a*, a dual link handover component 410-*a*, or a transmitter 415-*a*. Wireless device 500 may also include a processor. Each of these components may be in communication with one another. The dual link handover component 410-*a* may also include a connection reconfiguration component 505, a data component 510, an access component 515, and a reconfiguration component 520.

The receiver 405-*a* may receive information which may be passed on to dual link handover component 410-*a*, and to other components of wireless device 500. The dual link handover component 410-*a* may perform the operations described herein and with reference to FIG. 4. The transmitter 415-*a* may transmit signals received from other components of wireless device 500.

The connection reconfiguration component 505 may receive a connection reconfiguration message associated with a handover from a source base station to a target base station as described herein and with reference to FIGS. 2-3.

The data component 510 may receive a data transmission from the source base station after receiving the connection reconfiguration message as described herein and with reference to FIGS. 2-3. The data component 510 may also receive a subsequent data transmission from the target base station based on the reset MAC configuration, the reset RLC configuration, or the reestablished PDCP configuration. In some examples, the data transmission and the subsequent data transmission use a same RLC/PDCP stack. The data component 510 may also receive a second data transmission from the target base station prior to resetting the MAC configuration, resetting the RLC configuration, or reestablishing the PDCP configuration. In some examples, the second data transmission may be a source base station ciphered transmission. Additionally or alternatively, the second data transmission corresponds to a same logical channel as the data transmission from the source base station. The data component 510 may also send a data transmission to the wireless device based on receiving the SN status transfer message or the bearer data message.

The access component 515 may perform an access procedure with the target base station based on receiving the connection reconfiguration message as described herein and with reference to FIGS. 2-3. The access component 515 may also determine whether the access procedure was successful. In some examples, performing a successful access procedure includes receiving a contention resolution message from the target base station. The access component 515 may also receive a connection reconfiguration complete message from the wireless device based on the access request.

The reconfiguration component 520 may reset a MAC configuration, reset an RLC configuration, or reestablish a PDCP configuration, or all three, based on the successful access procedure as described herein and with reference to FIGS. 2-3.

Figure 6:
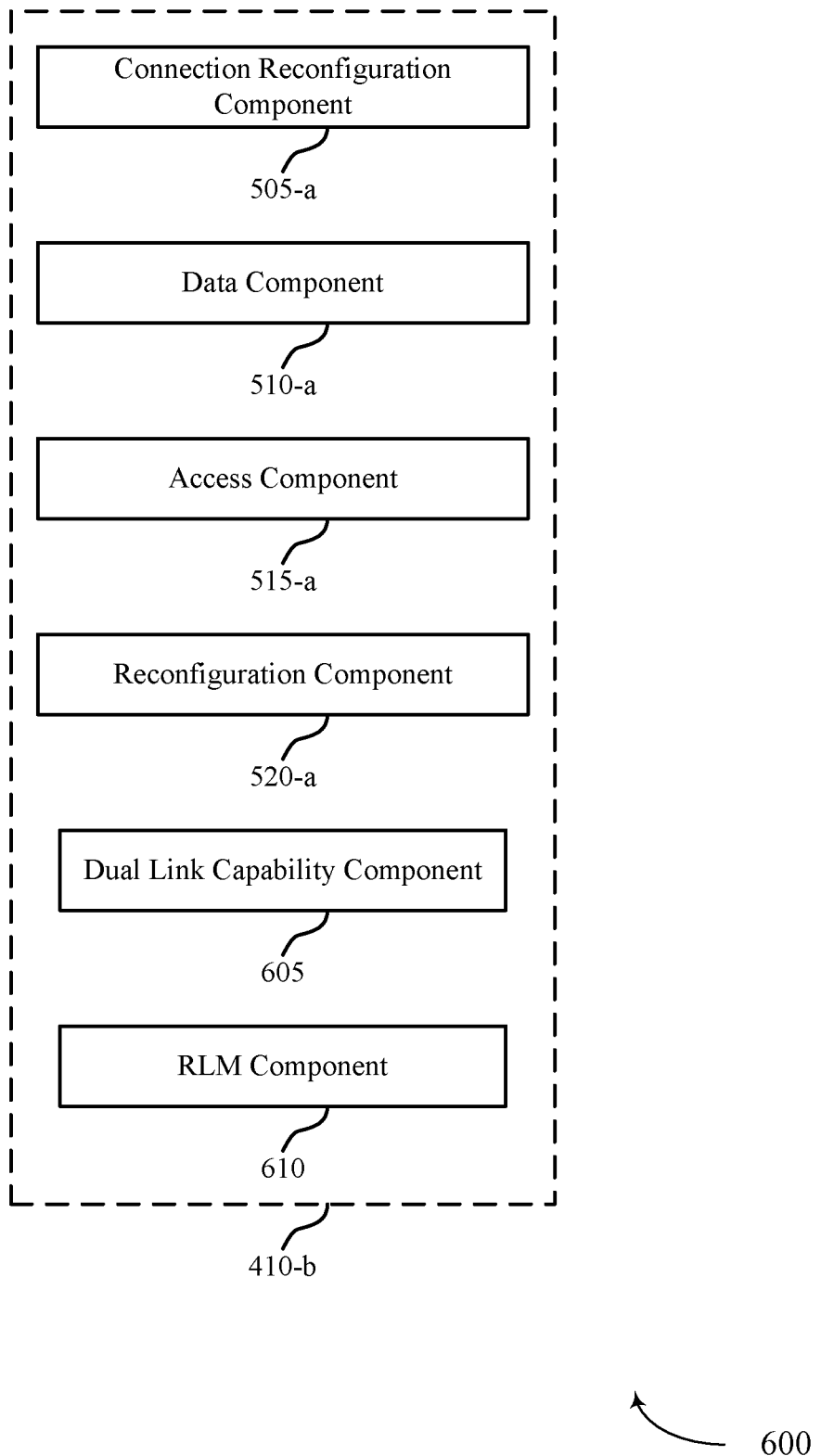

FIG. 6 shows a block diagram 600 of a dual link handover component 410-b which may be a component of a wireless device 400 or a wireless device 500 that supports dual link handover in accordance with various aspects of the present disclosure. The dual link handover component 410-b may be an example of aspects of a dual link handover component 410 described with reference to FIGS. 4-5. The dual link handover component 410-b may include a connection reconfiguration component 505-a, a data component 510-a, an access component 515-a, and a reconfiguration component 520-a. Each of these components may perform the functions described herein and with reference to FIG. 5. The dual link handover component 410-b may also include a dual link capability component 605, and a RLM component 610.

The dual link capability component 605 may transmit an indication of a dual link handover capability to the source base station, and the data transmission may be received based at least in part on the indication as described herein and with reference to FIGS. 2-3. In some examples, the dual link handover capability may be associated with a low latency capability. The dual link capability component 605 may also send the indication of the dual link handover capability to the target base station. The RLM component 610 may suppress an RLM procedure based, for instance, on receiving the connection reconfiguration message as described herein and with reference to FIGS. 2-3.

Figure 7:
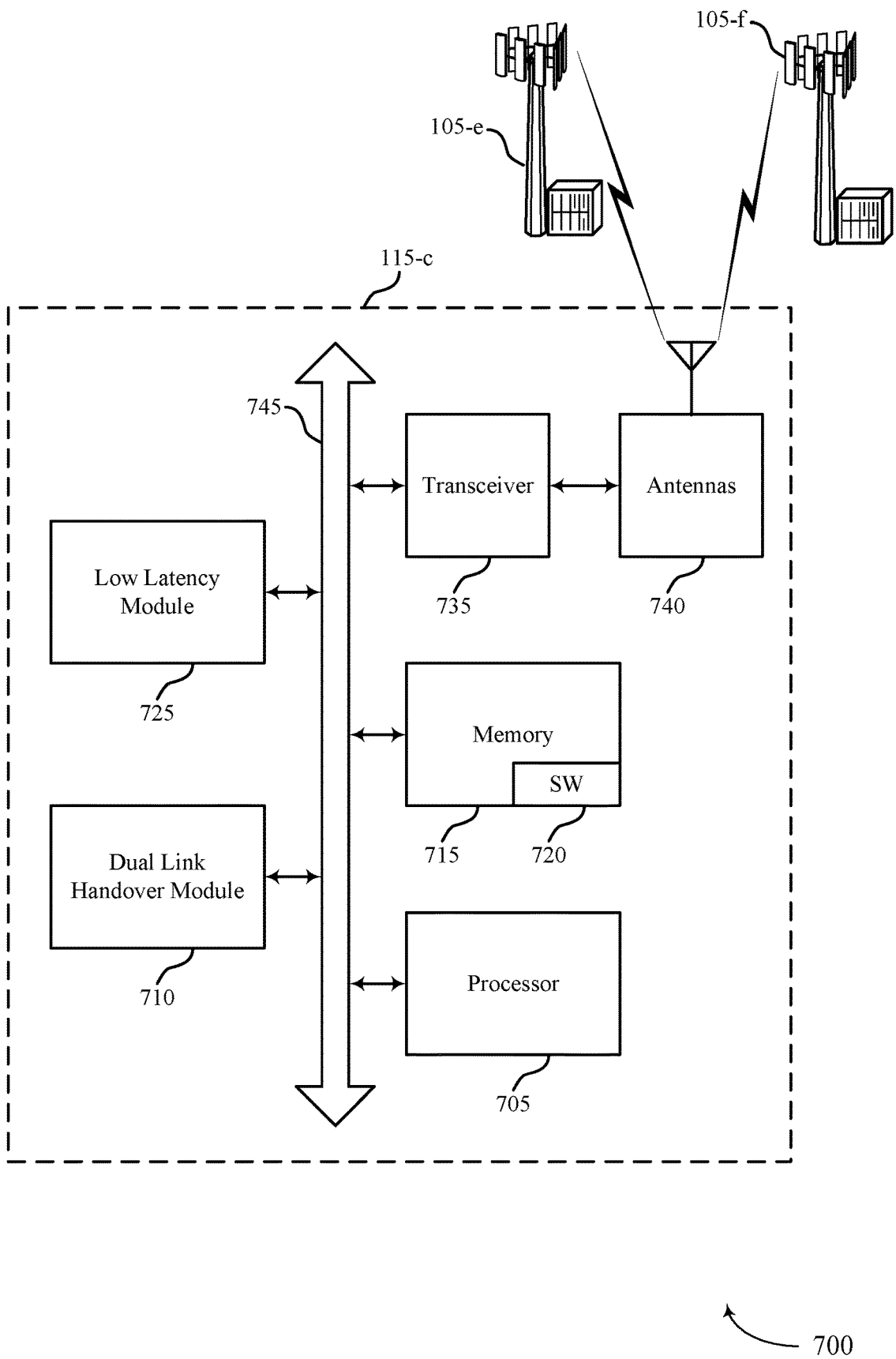
FIG. 7 illustrates a block diagram of a system including a user equipment (UE) that supports dual link handover in accordance with various aspects of the present disclosure.

FIG. 7 shows a diagram of a system 700 including a UE 115 that supports for dual link handover in accordance with various aspects of the present disclosure. System 700 may include UE 115-c, which may be an example of a wireless device 400, a wireless device 500, or a UE 115 described herein and with reference to FIGS. 1,2 and 4-6. UE 115-c may include a dual link handover component 710, which may be an example of a dual link handover component 410 described with reference to FIGS. 4-6. UE 115-c may also include a low latency component 725. UE 115-c may also include components for bi-directional voice and data communications including components for transmitting communications and components for receiving communications. For example, UE 115-c may communicate bi-directionally with base station 105-e or base station 105-f. For example, base station 105-e may be a source base station 105, and base station 105-f may be a target base station 105 during a handover procedure.

Low latency component 725 may perform low latency operations or configure UE 115-c for low latency operations. For example, low latency component 725 may support communications using a TTI length that is less than an LTE subframe. In some examples, low latency operations may be based on a TTI length of one LTE symbol period.

UE 115-c may also include a processor 705, and memory 715 (including software (SW) 720), a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 105 or another UE 115. The transceiver 735 may include a modem to modulate the packets and provide the modulated packets to the antenna(s) 740 for transmission, and to demodulate packets received from the antenna(s) 740. While UE 115-c may include a single antenna 740, UE 115-c may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., dual link handover, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application-specific integrated circuit (ASIC), etc.)

Figure 8:
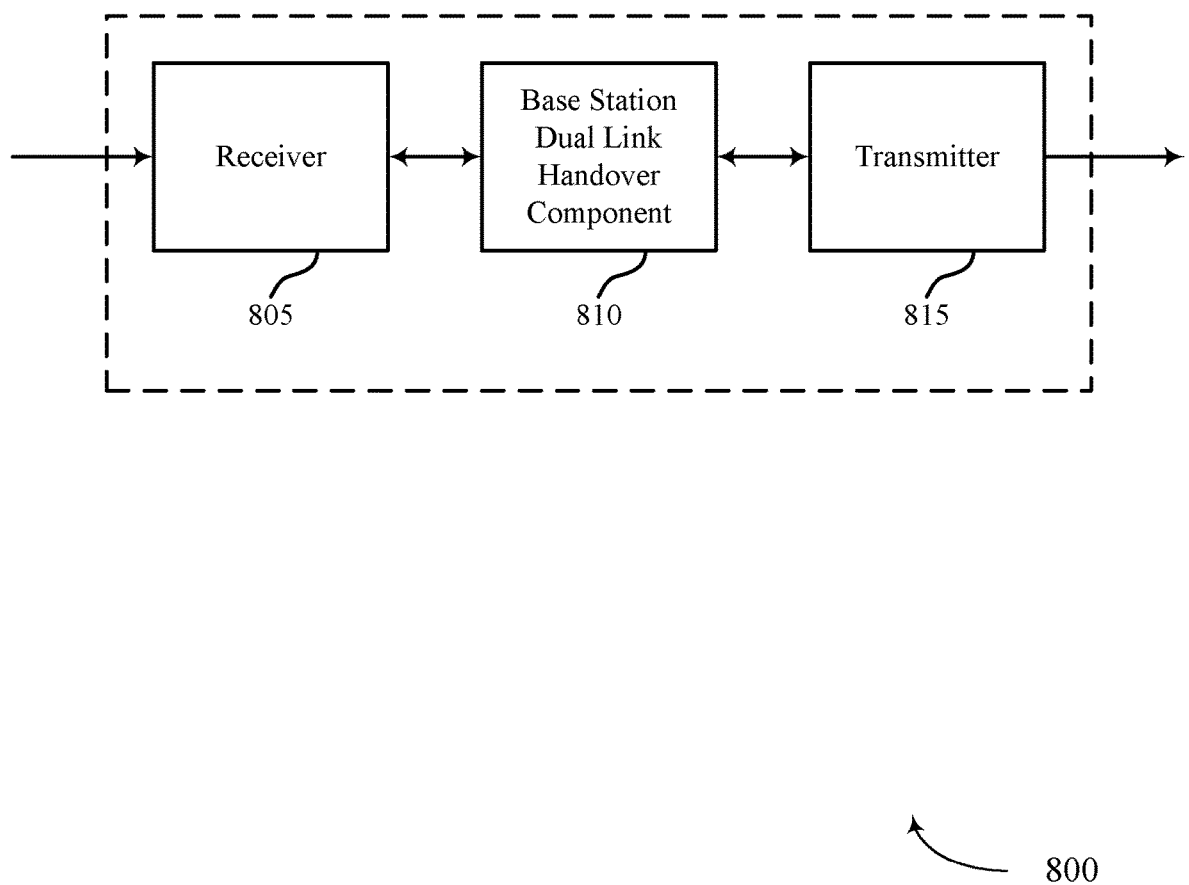
FIGS. 8-10 show block diagrams of a wireless device or devices that supports dual link handover in accordance with various aspects of the present disclosure.

FIG. 8 shows a block diagram of a wireless device 800 that supports dual link handover in accordance with various aspects of the present disclosure. Wireless device 800 may be an example of aspects of a base station 105 described with reference to FIGS. 1-3 and 7. Wireless device 800 may include a receiver 805, a base station (BS) dual link handover component 810, or a transmitter 815. Wireless device 800 may also include a processor. Each of these components may be in communication with one another.

The receiver 805 may receive information such as packets, user data, or control information associated with various information channels (e.g., control channels, data channels, and information related to dual link handover, etc.). Information may be passed on to the base station dual link handover component 810, and to other components of wireless device 800.

The base station dual link handover component 810 may send a connection reconfiguration message associated with a handover of a wireless device to a target base station, send a data transmission to the wireless device after sending the connection reconfiguration message, and receive a handover execution message from the target base station or the wireless device after the wireless device performs a successful access procedure for the target base station. In some examples, the base station dual link handover component 810 may receive a handover prepare request from a source base station, receive an access request from a wireless device (e.g., UE) receive a connection reconfiguration complete message from the wireless device, and transmit a handover execution message to the source base station based on the connection reconfiguration complete message. In some examples, the base station dual link handover component 810 may determine that the target base station does not support dual link handover. For example, the source base station dual link handover component 810 may receive an indication of the capabilities of the target base station, which may indicate that the target base station does not have dual link handover capability. The base station dual link handover component 810 may refrain transmission of the connection reconfiguration message associated with a handover of the wireless device to the target base station, based on the determination.

The transmitter 815 may transmit signals received from other components of wireless device 800. In some examples, the transmitter 815 may be collocated with the receiver 805 in a transceiver component. The transmitter 815 may include a single antenna, or it may include a plurality of antennas.

Figure 9:
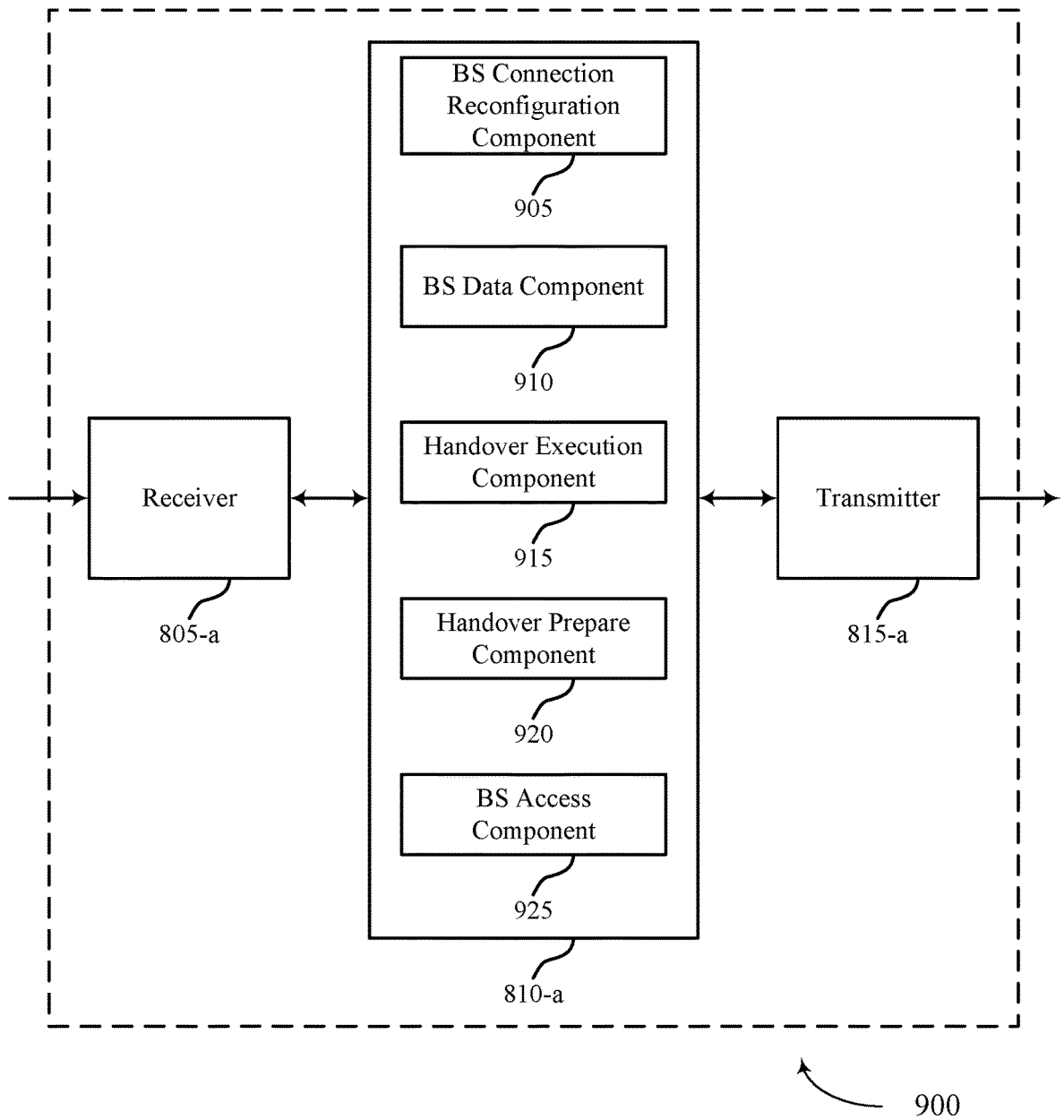

FIG. 9 shows a block diagram of a wireless device 900 that supports dual link handover in accordance with various aspects of the present disclosure. Wireless device 900 may be an example of aspects of a wireless device 800 or a base station 105 described with reference to FIGS. 1-8. Wireless device 900 may include a receiver 805-*a*, a base station dual link handover component 810-*a*, or a transmitter 815-*a*. Wireless device 900 may also include a processor. Each of these components may be in communication with one another. The base station dual link handover component 810-*a* may also include a B S connection reconfiguration component 905, a BS data component 910, a handover execution component 915, a handover prepare component 920, and a BS access component 925.

The receiver 805-*a* may receive information which may be passed on to base station dual link handover component 810-*a*, and to other components of wireless device 900. The base station dual link handover component 810-*a* may perform the operations described herein and with reference to FIG. 8. The transmitter 815-*a* may transmit signals received from other components of wireless device 900.

The BS connection reconfiguration component 905 may send a connection reconfiguration message associated with a handover of a wireless device to a target base station as described herein and with reference to FIGS. 2-3.

The BS data component 910 may send a data transmission to the wireless device after sending the connection reconfiguration message as described herein and with reference to FIGS. 2-3.

The handover execution component 915 may receive a handover execution message from the target base station or the wireless device after the wireless device performs a successful access procedure for the target base station as described herein and with reference to FIGS. 2-3. The handover execution component 915 may also transmit a handover execution message to the source base station based on the connection reconfiguration complete message.

The handover prepare component 920 may receive a handover prepare request from a source base station as described herein and with reference to FIGS. 2-3. The BS access component 925 may receive an access request from a wireless device as described herein and with reference to FIGS. 2-3.

Figure 10:
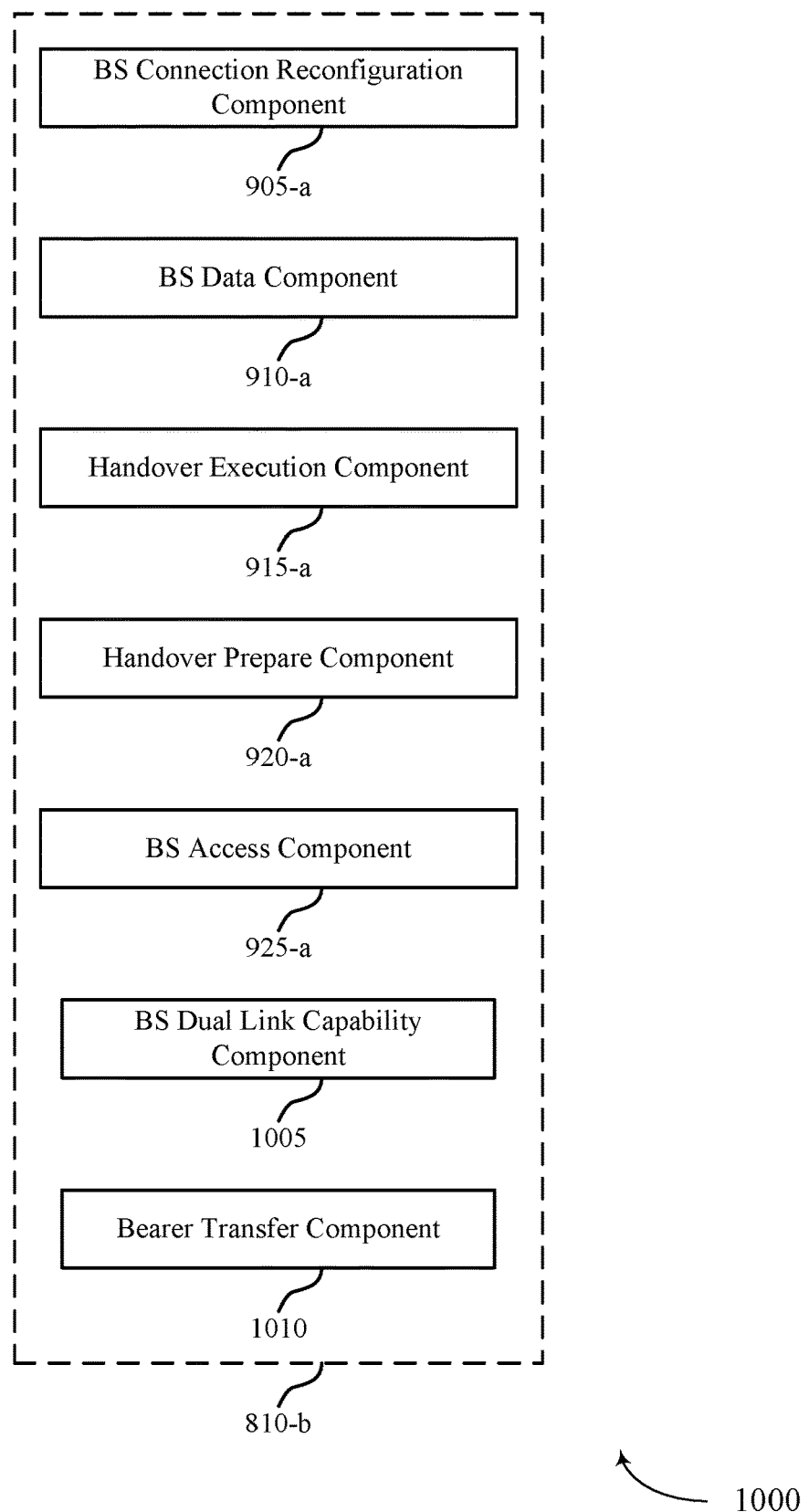

FIG. 10 shows a block diagram 1000 of a base station dual link handover component 810-*b* which may be a component of a wireless device 800 or a wireless device 900 that supports dual link handover in accordance with various aspects of the present disclosure. The base station dual link handover component 810-*b* may be an example of aspects of a base station dual link handover component 810 described with reference to FIGS. 8-9. The base station dual link handover component 810-*b* may include a BS connection reconfiguration component 905-*a*, a BS data component 910-*a*, a handover execution component 915-*a*, a handover prepare component 920-*a*, and a BS access component 925-*a*. Each of these components may perform the functions described herein and with reference to FIG. 9. The base station dual link handover component 810-*b* may also include a BS dual link capability component 1005, and a bearer transfer component 1010.

The BS dual link capability component 1005 may receive an indication of a dual link handover capability from the wireless device, such that a data transmission may be sent based at least in part on the indication as described herein and with reference to FIGS. 2-3. The BS dual link capability component 1005 may also transmit an SN status transfer message or a bearer data message to the target base station in response to the handover execution message. In some cases, the BS dual link capability component 1005 may transmit a first indication of a dual link handover capability to the source base station. The BS dual link capability component 1005 may also receive a second indication of a dual link handover capability from the source base station, such that the data transmission is sent based at least in part on the second indication. In some examples, the dual link handover capability may be associated with a low latency capability.

The bearer transfer component 1010 may receive an SN status transfer message or a bearer data message from the source base station in response to the handover execution message as described herein and with reference to FIGS. 2-3.

Figure 11:
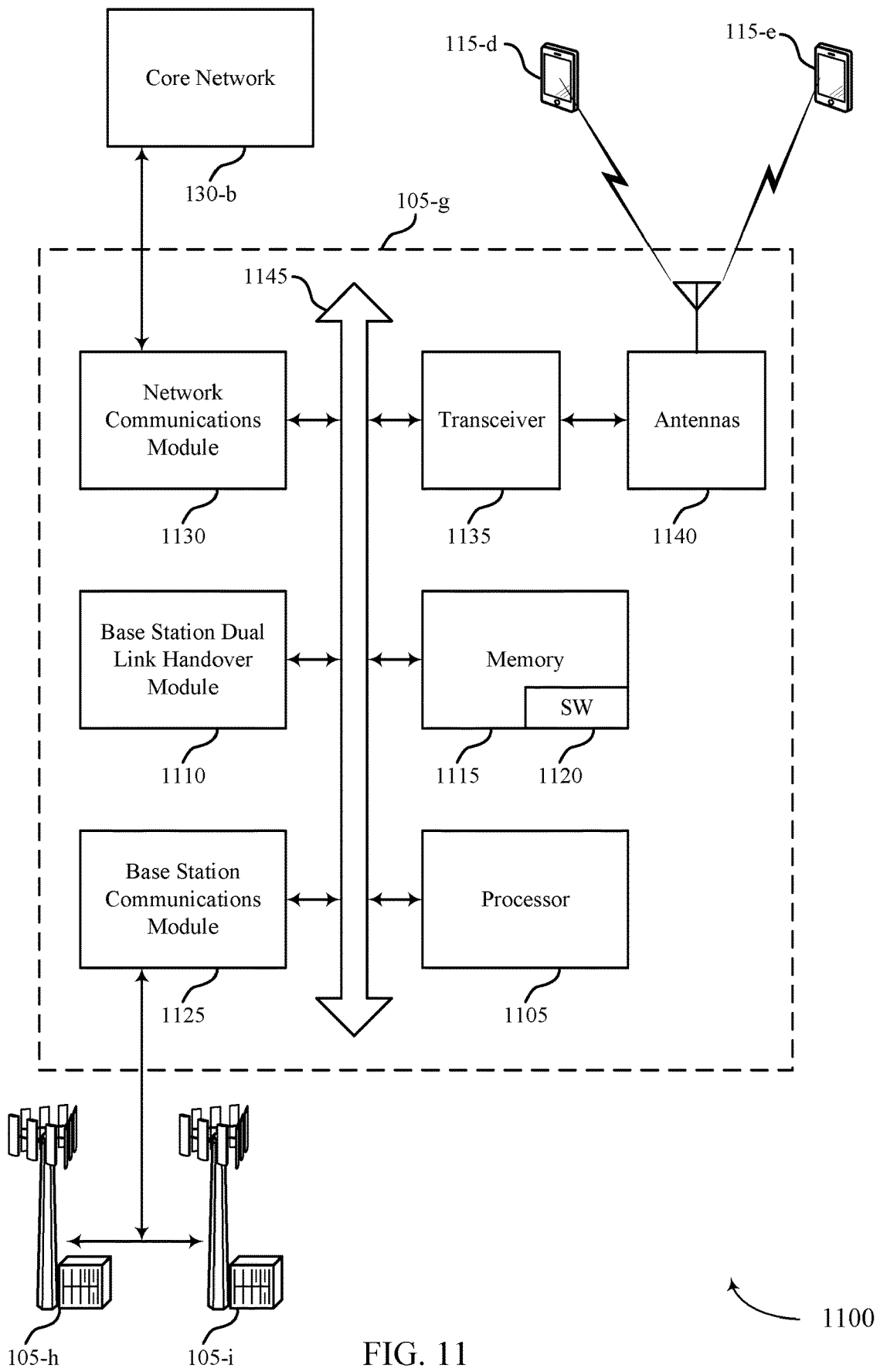
FIG. 11 illustrates a block diagram of a system including a base station that supports dual link handover in accordance with various aspects of the present disclosure.

FIG. 11 shows a diagram of a system 1100 including a base station 105 that supports dual link handover in accordance with various aspects of the present disclosure. System 1100 may include base station 105-*g*, which may be an example of a wireless device 800, a wireless device 900, or a base station 105 described herein and with reference to FIGS. 1, 2 and 8-10. Base Station 105-*g* may include a base station dual link handover component 1110, which may be an example of a base station dual link handover component 810 described with reference to FIGS. 8-10. Base Station 105-*g* may also include components for bi-directional voice and data communications including components for transmitting communications and components for receiving communications. For example, base station 105-*g* may communicate bi-directionally with UE 115-*d* or UE 115-*e*. Base station 105-*g* may perform both the role of a source base station 105 or a target base station 105 for different UEs 115.

In some cases, base station 105-*g* may have one or more wired backhaul links. Base station 105-*g* may have a wired backhaul link (e.g., S1 interface, etc.) to the core network 130-*b*. Base station 105-*g* may also communicate with other base stations 105, such as base station 105-*h* and base station 105-*i* via inter-base station backhaul links (e.g., an X2 interface). Each of the base stations 105 may communicate with UEs 115 using the same or different wireless communications technologies. In some cases, base station 105-*g* may communicate with other base stations such as 105-*h* or 105-*i* utilizing base station communications component 1125. In some examples, base station communications component 1125 may provide an X2 interface within an LTE/LTE-A wireless communication network technology to provide communication between some of the base stations 105. In some examples, base station 105-*g* may communicate with other base stations through core network 130-*b*. In some cases, base station 105-*g* may communicate with the core network 130-*b* through network communications component 1130.

The base station 105-*g* may include a processor 1105, memory 1115 (including software (SW) 1120), transceiver 1135, and antenna(s) 1140, which each may be in communication, directly or indirectly, with one another (e.g., over bus system 1145). The transceiver 1135 may be configured to communicate bi-directionally, via the antenna(s) 1140, with the UEs 115, which may be multi-mode devices. The transceiver 1135 (or other components of the base station 105-*g*) may also be configured to communicate bi-directionally, via the antenna(s) 1140, with one or more other base stations (not shown). The transceiver 1135 may include a modem configured to modulate the packets and provide the modulated packets to the antenna(s) 1140 for transmission, and to demodulate packets received from the antenna(s) 1140. The base station 105-*g* may include multiple transceivers 1135, each with one or more associated antenna(s) 1140. The transceiver may be an example of a combined receiver 805 and transmitter 815 of FIG. 8.

The memory 1115 may include RAM and ROM. The memory 1115 may also store computer-readable, computer-executable software code 1120 containing instructions that are configured to, when executed, cause the processor 1105 to perform various functions described herein (e.g., dual link handover, selecting coverage enhancement techniques, call processing, database management, message routing, etc.). Alternatively, the software code 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing components, base band processors, radio head controllers, digital signal processor (DSPs), and the like.

The base station communications component 1125 may manage communications with other base stations 105. The communications management component may include a controller or scheduler for controlling communications with UEs 115 in cooperation with other base stations 105. For example, the base station communications component 1125 may coordinate scheduling for handover procedures or for transmissions to UEs 115 for various interference mitigation techniques such as beamforming or joint transmission.

The components of wireless device 400, wireless device 500, dual link handover component 410, system 700, wireless device 800, wireless device 900, base station dual link handover component 810-b, and system 1100 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field-programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 12:
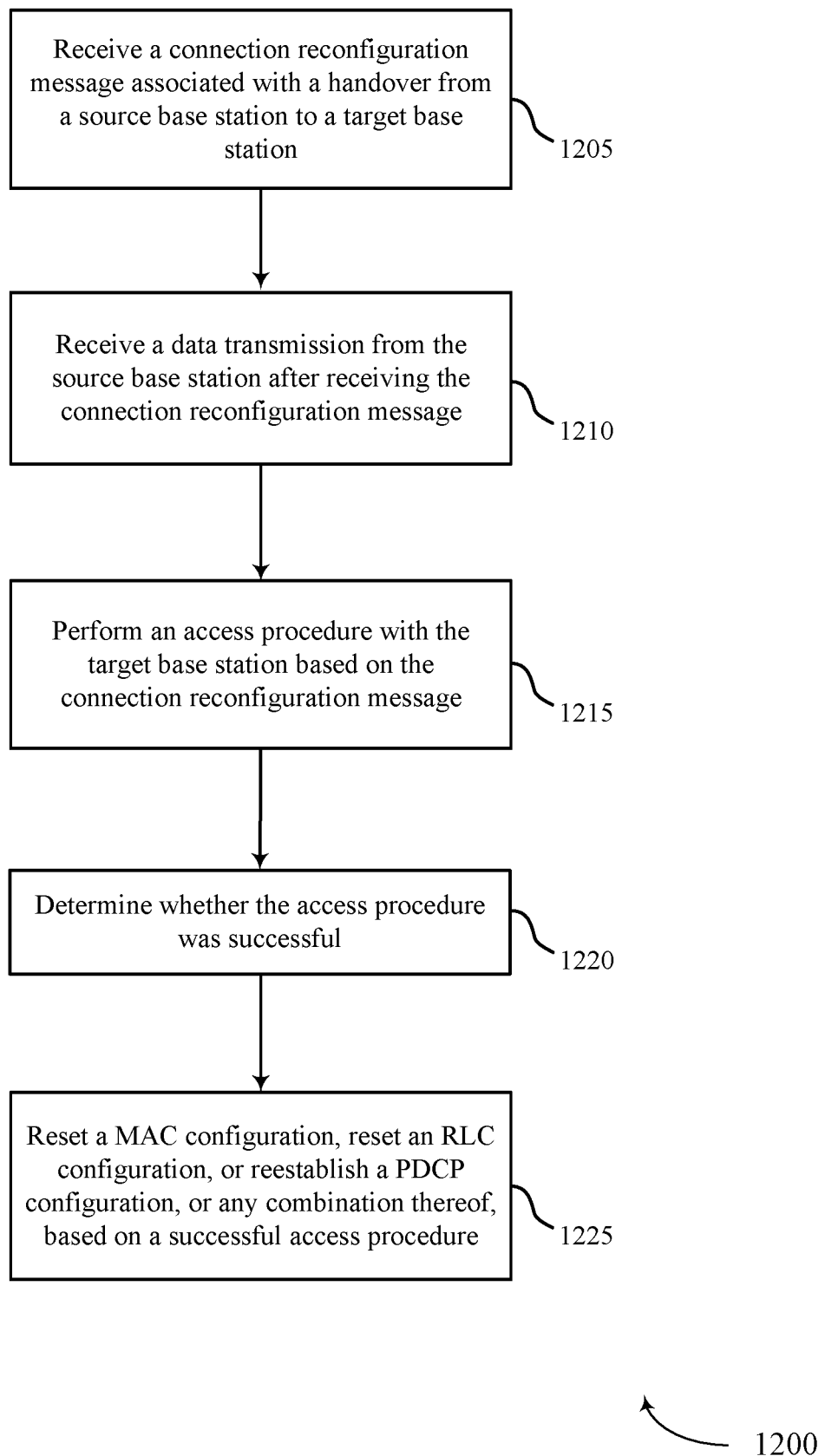
FIGS. 12-17 illustrate methods for dual link handover in accordance with various aspects of the present disclosure.

FIG. 12 shows a flowchart illustrating a method 1200 for dual link handover in accordance with various aspects of the present disclosure. The operations of method 1200 may be implemented by a UE 115 or its components as described with reference to FIGS. 1-11. For example, the operations of method 1200 may be performed by the dual link handover component 410 as described with reference to FIGS. 4-7. In some examples, a UE 115 may execute a set of codes to control the functional elements of the UE 115 to perform the functions described below. Additionally or alternatively, the UE 115 may perform aspects of the functions described below using special-purpose hardware.

At block 1205, the UE 115 may receive a connection reconfiguration message associated with a handover from a source base station to a target base station as described herein and with reference to FIGS. 2-3. In some examples, the operations of block 1205 may be performed by the connection reconfiguration component 505 as described herein and with reference to FIG. 5.

At block 1210, the UE 115 may receive a data transmission from the source base station after receiving the connection reconfiguration message as described herein and with reference to FIGS. 2-3. In some examples, the operations of block 1210 may be performed by the data component 510 as described herein and with reference to FIG. 5.

At block 1215, the UE 115 may perform an access procedure with the target base station based on receiving the connection reconfiguration message as described herein and with reference to FIGS. 2-3. In some examples, the operations of block 1215 may be performed by the access component 515 as described herein and with reference to FIG. 5.

At block 1220, the UE 115 may determine whether the access procedure was successful as described herein and with reference to FIGS. 2-3. In some examples, the operations of block 1220 may be performed by the access component 515 as described herein and with reference to FIG. 5.

At block 1225, the UE 115 may reset a MAC configuration, reset an RLC configuration, or reestablish a PDCP configuration, or any combination thereof, based on a successful access procedure as described herein and with reference to FIGS. 2-3. In some examples, the operations of block 1225 may be performed by the reconfiguration component 520 as described herein and with reference to FIG. 5.

Figure 13:
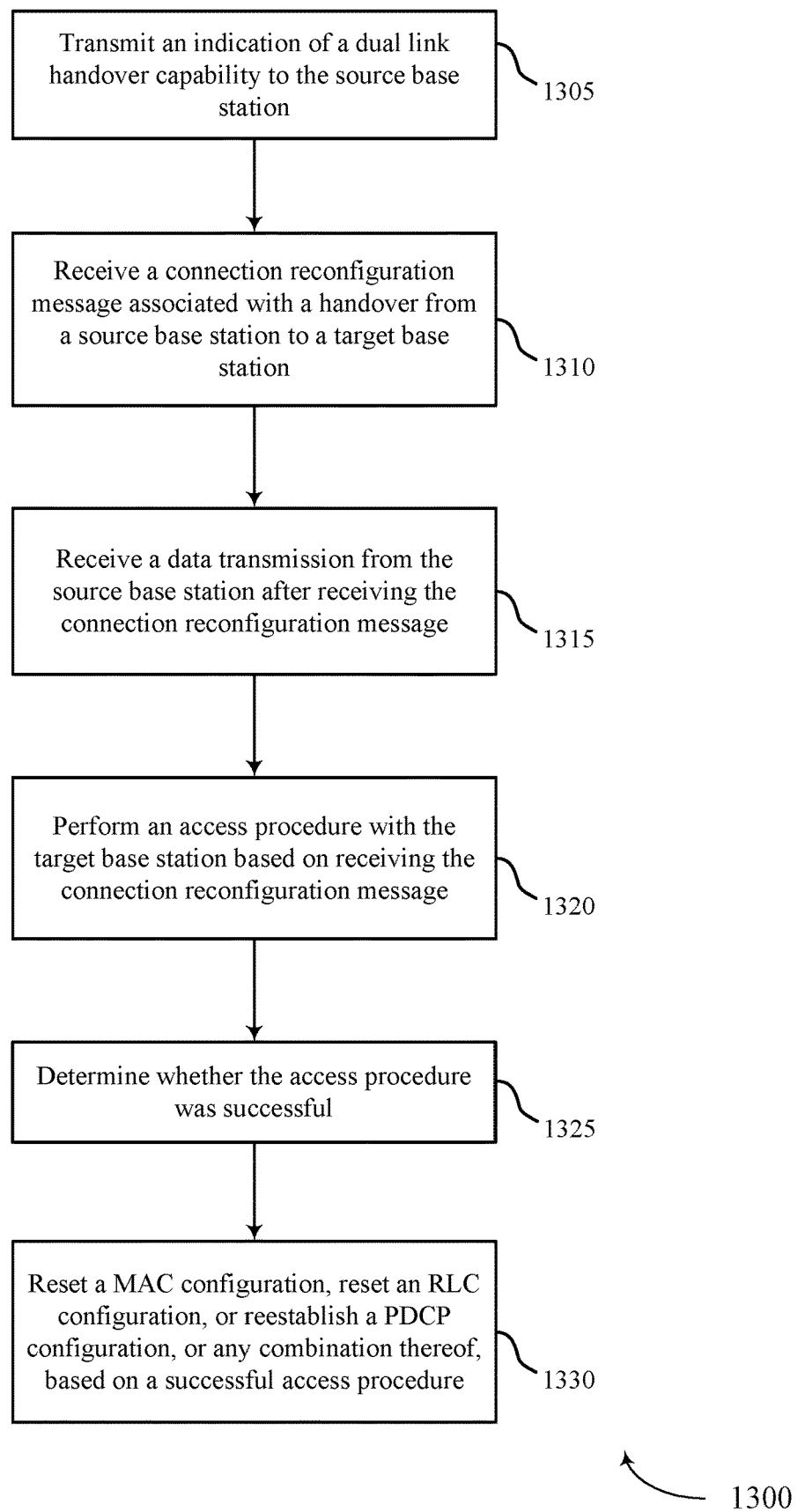

FIG. 13 shows a flowchart illustrating a method 1300 for dual link handover in accordance with various aspects of the present disclosure. The operations of method 1300 may be implemented by a UE 115 or its components as described with reference to FIGS. 1-11. For example, the operations of method 1300 may be performed by the dual link handover component 410 as described with reference to FIGS. 4-7. In some examples, a UE 115 may execute a set of codes to control the functional elements of the UE 115 to perform the functions described below. Additionally or alternatively, the UE 115 may perform aspects of the functions described below using special-purpose hardware. The method 1300 may also incorporate aspects of method 1200 of FIG. 12.

At block 1305, the UE 115 may transmit an indication of a dual link handover capability to the source base station, such that a data transmission may be received after a handover command based at least in part on the indication as described herein and with reference to FIGS. 2-3. In some examples, the operations of block 1305 may be performed by the dual link capability component 605 as described herein and with reference to FIG. 6.

At block 1310, the UE 115 may receive a connection reconfiguration message associated with a handover from a source base station to a target base station as described herein and with reference to FIGS. 2-3. In some examples, the operations of block 1310 may be performed by the connection reconfiguration component 505 as described herein and with reference to FIG. 5.

At block 1315, the UE 115 may receive a data transmission from the source base station after receiving the connection reconfiguration message as described herein and with reference to FIGS. 2-3. In some examples, the operations of block 1315 may be performed by the data component 510 as described herein and with reference to FIG. 5.

At block 1320, the UE 115 may perform a successful access procedure with the target base station based on receiving the connection reconfiguration message as described herein and with reference to FIGS. 2-3. In some examples, the operations of block 1320 may be performed by the access component 515 as described herein and with reference to FIG. 5.

At block 1325, the UE 115 may determine whether the access procedure was successful as described herein and with reference to FIGS. 2-3. In some examples, the operations of block 1325 may be performed by the access component 515 as described herein and with reference to FIG. 5.

At block 1330, the UE 115 may reset a MAC configuration, reset an RLC configuration, or reestablish a PDCP configuration, or any combination thereof, based on a successful access procedure as described herein and with reference to FIGS. 2-3. In some examples, the operations of block 1330 may be performed by the reconfiguration component 520 as described herein and with reference to FIG. 5.

Figure 14:
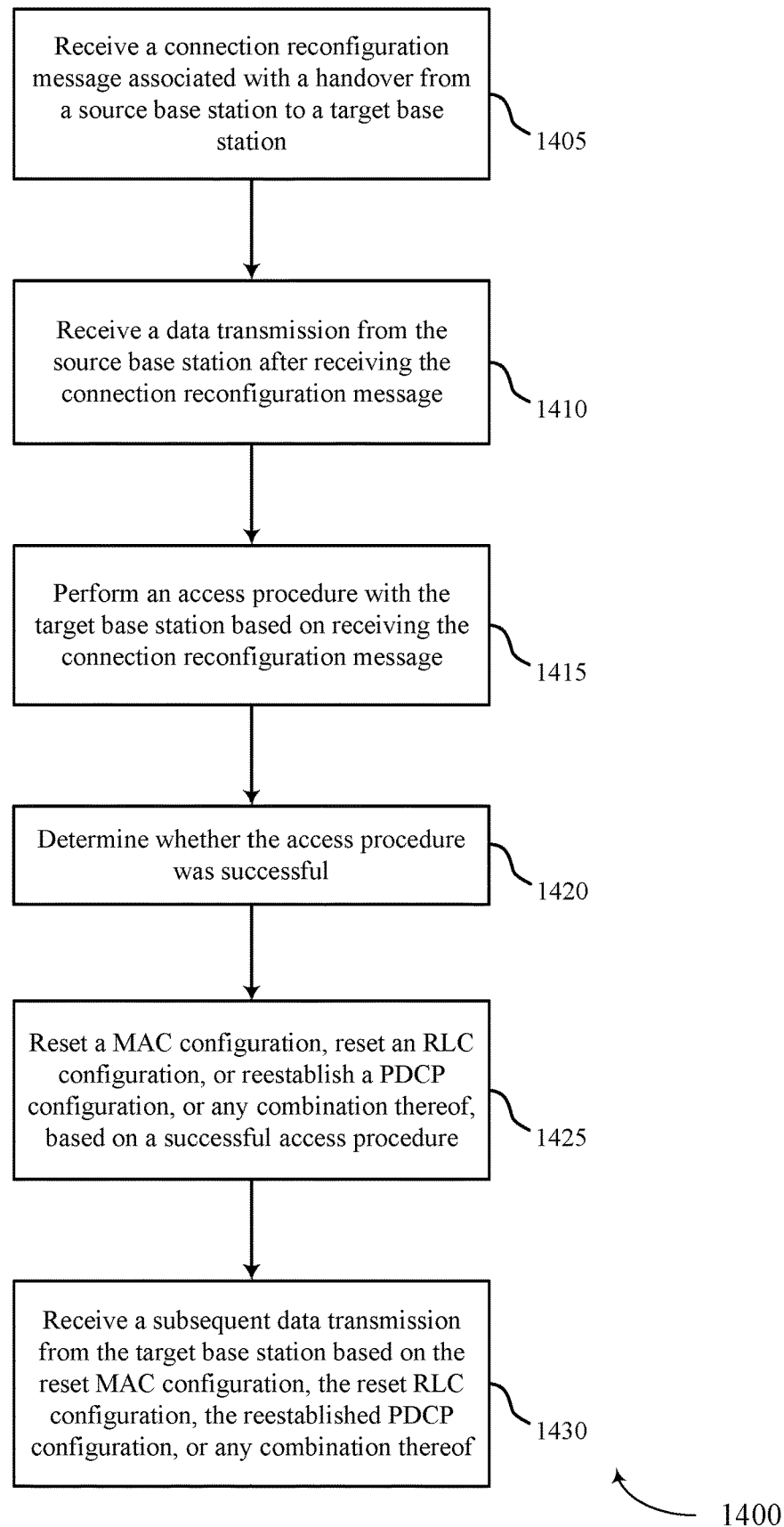

FIG. 14 shows a flowchart illustrating a method 1400 for dual link handover in accordance with various aspects of the present disclosure. The operations of method 1400 may be implemented by a UE 115 or its components as described with reference to FIGS. 1-11. For example, the operations of method 1400 may be performed by the dual link handover component 410 as described with reference to FIGS. 4-7. In some examples, a UE 115 may execute a set of codes to control the functional elements of the UE 115 to perform the functions described below. Additionally or alternatively, the UE 115 may perform aspects of the functions described below using special-purpose hardware. The method 1400 may also incorporate aspects of methods 1200, and 1300 of FIGS. 12-13.

At block 1405, the UE 115 may receive a connection reconfiguration message associated with a handover from a source base station to a target base station as described herein and with reference to FIGS. 2-3. In some examples, the operations of block 1405 may be performed by the connection reconfiguration component 505 as described herein and with reference to FIG. 5.

At block 1410, the UE 115 may receive a data transmission from the source base station after receiving the connection reconfiguration message as described herein and with reference to FIGS. 2-3. In some examples, the operations of block 1410 may be performed by the data component 510 as described herein and with reference to FIG. 5.

At block 1415, the UE 115 may perform an access procedure with the target base station based on receiving the connection reconfiguration message as described herein and with reference to FIGS. 2-3. In some examples, the operations of block 1415 may be performed by the access component 515 as described herein and with reference to FIG. 5.

At block 1420, the UE 115 may determine whether the access procedure was successful as described herein and with reference to FIGS. 2-3. In some examples, the operations of block 1420 may be performed by the access component 515 as described herein and with reference to FIG. 5.

At block 1425, the UE 115 may reset a MAC configuration, reset an RLC configuration, reestablish a PDCP configuration, or any combination thereof, based on a successful access procedure as described herein and with reference to FIGS. 2-3. In some examples, the operations of block 1425 may be performed by the reconfiguration component 520 as described herein and with reference to FIG. 5.

At block 1430, the UE 115 may receive a subsequent data transmission from the target base station based on the reset MAC configuration, the reset RLC configuration, the reestablished PDCP configuration, or any combination thereof as described herein and with reference to FIGS. 2-3. In some examples, the operations of block 1430 may be performed by the data component 510 as described herein and with reference to FIG. 5.

Figure 15:
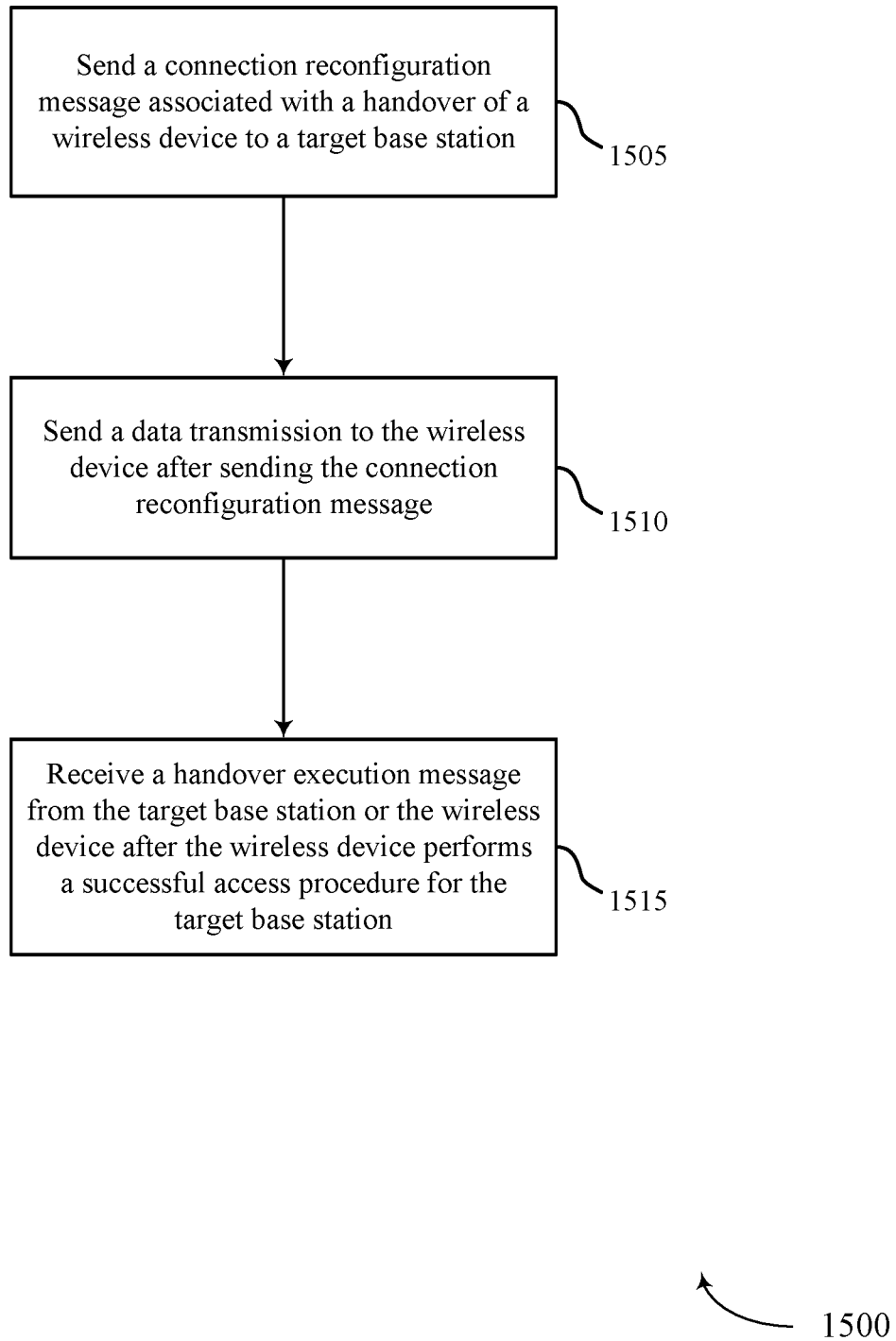

FIG. 15 shows a flowchart illustrating a method 1500 for dual link handover in accordance with various aspects of the present disclosure. The operations of method 1500 may be implemented by a base station 105 or its components as described with reference to FIGS. 1-11. For example, the operations of method 1500 may be performed by the base station dual link handover component 810 as described with reference to FIGS. 8-11. In some examples, a base station 105 may execute a set of codes to control the functional elements of the base station 105 to perform the functions described below. Additionally or alternatively, the base station 105 may perform aspects of the functions described below using special-purpose hardware. The method 1500 may also incorporate aspects of methods 1200, 1300, and 1400 of FIGS. 12-14.

At block 1505, the base station 105 may send a connection reconfiguration message associated with a handover of a wireless device to a target base station as described herein and with reference to FIGS. 2-3. In some examples, the operations of block 1505 may be performed by the BS connection reconfiguration component 905 as described herein and with reference to FIG. 9.

At block 1510, the base station 105 may send a data transmission to the wireless device after sending the connection reconfiguration message as described herein and with reference to FIGS. 2-3. In some examples, the operations of block 1510 may be performed by the BS data component 910 as described herein and with reference to FIG. 9.

At block 1515, the base station 105 may receive a handover execution message from the target base station or the wireless device after the wireless device performs a successful access procedure for the target base station as described herein and with reference to FIGS. 2-3. In some examples, the operations of block 1515 may be performed by the handover execution component 915 as described herein and with reference to FIG. 9.

Figure 16:
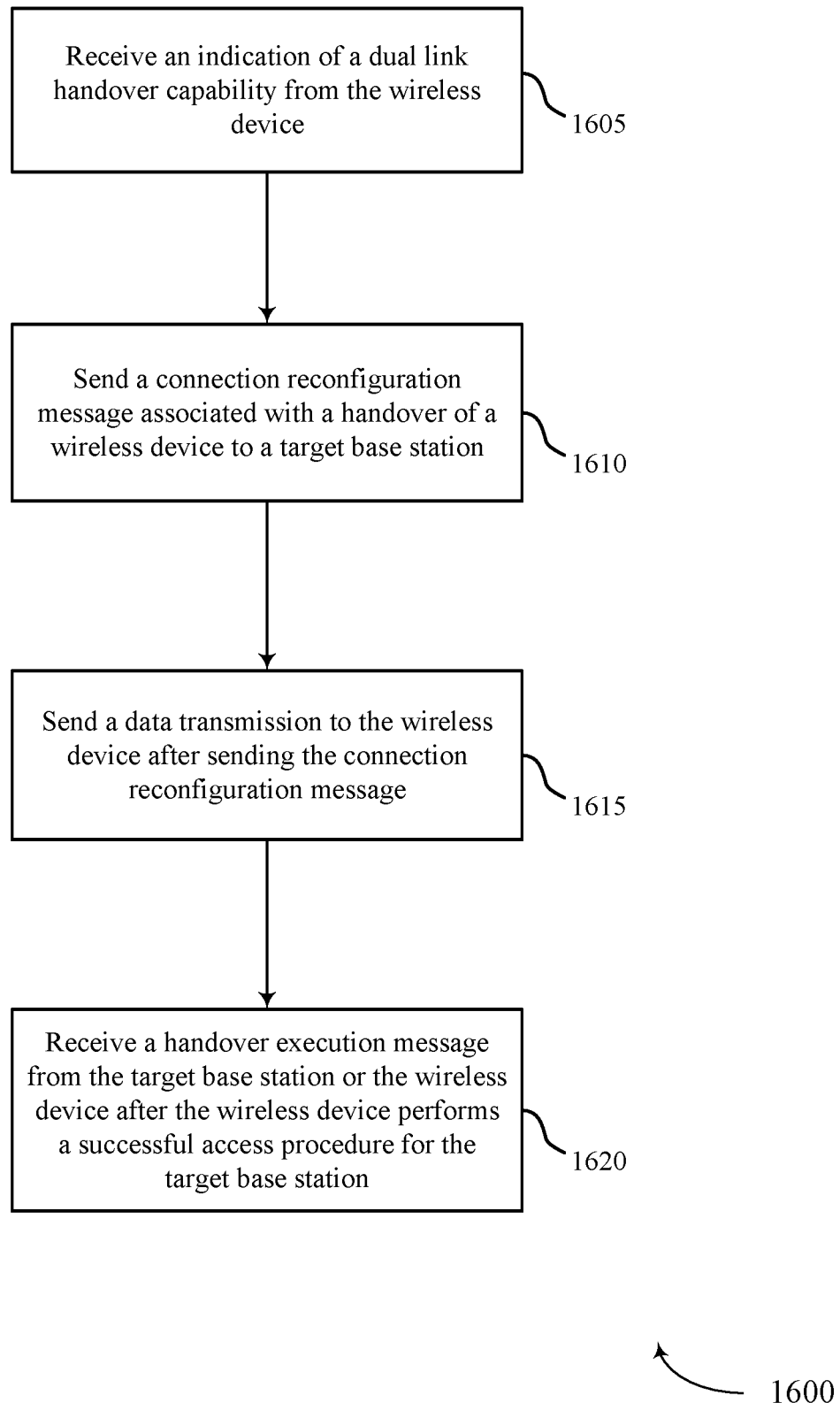

FIG. 16 shows a flowchart illustrating a method 1600 for dual link handover in accordance with various aspects of the present disclosure. The operations of method 1600 may be implemented by a base station 105 or its components as described with reference to FIGS. 1-11. For example, the operations of method 1600 may be performed by the base station dual link handover component 810 as described with reference to FIGS. 8-11. In some examples, a base station 105 may execute a set of codes to control the functional elements of the base station 105 to perform the functions described below. Additionally or alternatively, the base station 105 may perform aspects of the functions described below using special-purpose hardware. The method 1600 may also incorporate aspects of methods 1200, 1300, 1400, and 1500 of FIGS. 12-15.

At block 1605, the base station 105 may receive an indication of a dual link handover capability from the wireless device, such that data transmission is sent based at least in part on the indication as described herein and with reference to FIGS. 2-3. In some examples, the operations of block 1605 may be performed by the BS dual link capability component 1005 as described herein and with reference to FIG. 10.

At block 1610, the base station 105 may send a connection reconfiguration message associated with a handover of a wireless device to a target base station as described herein and with reference to FIGS. 2-3. In some examples, the operations of block 1610 may be performed by the BS connection reconfiguration component 905 as described herein and with reference to FIG. 9.

At block 1615, the base station 105 may send a data transmission to the wireless device after sending the connection reconfiguration message as described herein and with reference to FIGS. 2-3. In some examples, the operations of block 1615 may be performed by the BS data component 910 as described herein and with reference to FIG. 9.

At block 1620, the base station 105 may receive a handover execution message from the target base station or the wireless device after the wireless device performs a successful access procedure for the target base station as described herein and with reference to FIGS. 2-3. In some examples, the operations of block 1620 may be performed by the handover execution component 915 as described herein and with reference to FIG. 9.

Figure 17:
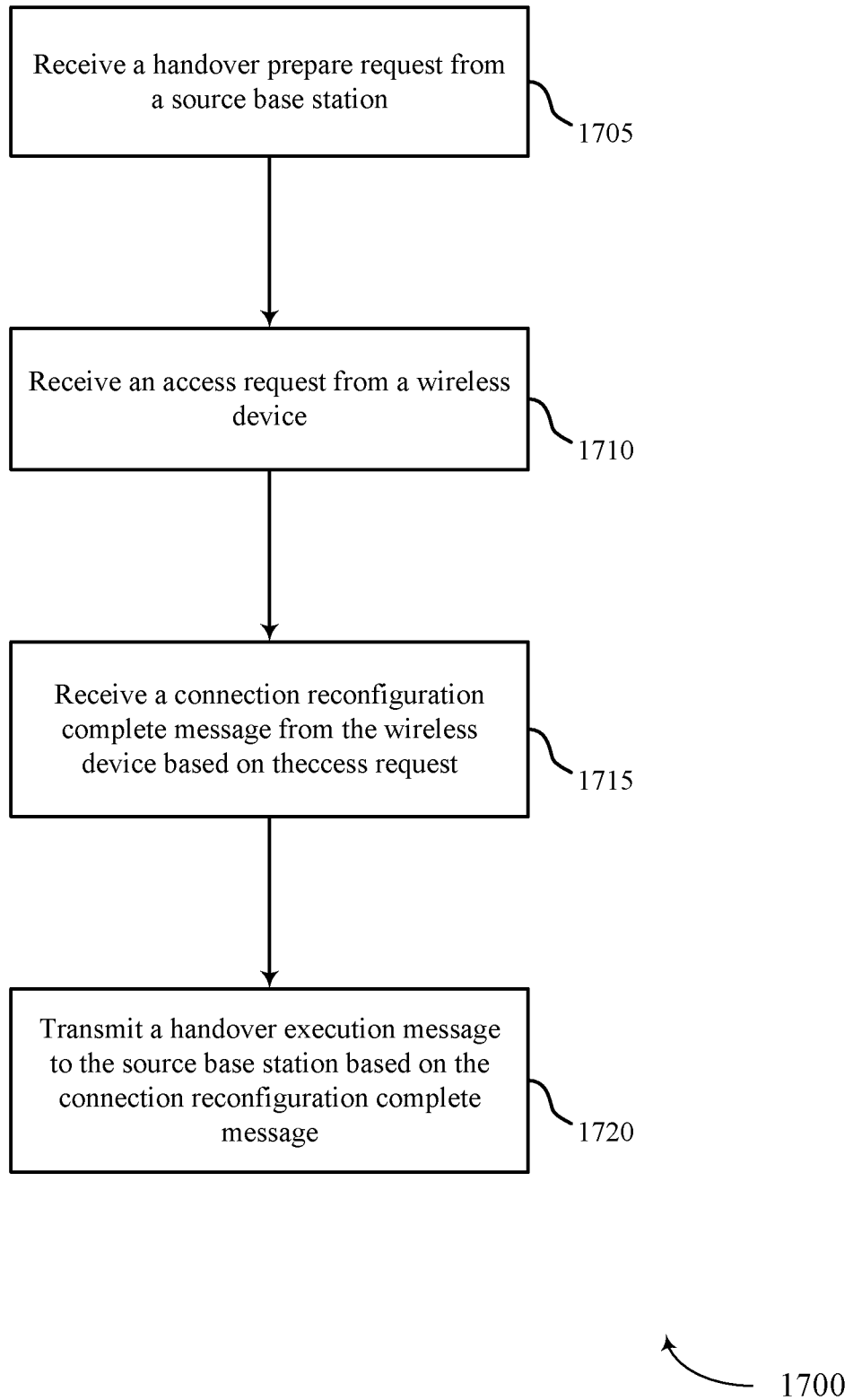

FIG. 17 shows a flowchart illustrating a method 1700 for dual link handover in accordance with various aspects of the present disclosure. The operations of method 1700 may be implemented by a base station 105 or its components as described with reference to FIGS. 1-11. For example, the operations of method 1700 may be performed by the base station dual link handover component 810 as described with reference to FIGS. 8-11. In some examples, a base station 105 may execute a set of codes to control the functional elements of the base station 105 to perform the functions described below. Additionally or alternatively, the base station 105 may perform aspects of the functions described below using special-purpose hardware. The method 1700 may also incorporate aspects of methods 1200, 1300, 1400, 1500, and 1600 of FIGS. 12-16.

At block 1705, the base station 105 may receive a handover prepare request from a source base station as described herein and with reference to FIGS. 2-3. In some examples, the operations of block 1705 may be performed by the handover prepare component 920 as described herein and with reference to FIG. 9.

At block 1710, the base station 105 may receive an access request from a wireless device as described herein and with reference to FIGS. 2-3. In some examples, the operations of block 1710 may be performed by the BS access component 925 as described herein and with reference to FIG. 9.

At block 1715, the base station 105 may receive a connection reconfiguration complete message from the wireless device based on the access request as described herein and with reference to FIGS. 2-3. In some examples, the operations of block 1715 may be performed by the access component 515 as described herein and with reference to FIG. 5.

At block 1720, the base station 105 may transmit a handover execution message to the source base station based on the connection reconfiguration complete message as described herein and with reference to FIGS. 2-3. In some examples, the operations of block 1720 may be performed by the handover execution component 915 as described herein and with reference to FIG. 9.

Thus, methods 1200, 1300, 1400, 1500, 1600, and 1700 mays support dual link handover. It should be noted that methods 1200, 1300, 1400, 1500, 1600, and 1700 describe possible implementations, and that the operations and the steps may be rearranged or otherwise modified such that other implementations are possible. In some examples, aspects from two or more of the methods 1200, 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "component," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication for a user equipment (UE), comprising:
    receiving, by the UE, a first data transmission from a source base station, the UE having a medium access control (MAC) configuration, a radio link control (RLC) configuration, and a packet data convergence protocol (PDCP) configuration;
    receiving a connection reconfiguration message associated with a handover from the source base station to a target base station;
    performing an access procedure with the target base station based at least in part on receiving the connection reconfiguration message, wherein the UE is capable of receiving data transmissions from the source base station after receiving the connection reconfiguration message;
    stopping the data transmissions with the source base station based at least in part on signaling received by the UE from the target base station, wherein the MAC configuration is maintained prior to stopping the data transmissions with the source base station; and
    resetting the MAC configuration, resetting the RLC configuration, or reestablishing a PDCP configuration, or any combination thereof, after stopping the data transmission.

2. The method of claim 1, further comprising:
    receiving a second data transmission from the source base station after receiving the connection reconfiguration message.

3. The method of claim 2, further comprising:
    transmitting an indication of a dual link handover capability to the source base station, wherein the second data transmission is received based at least in part on the indication.

4. The method of claim 3, wherein the dual link handover capability is associated with a low latency capability.

5. The method of claim 2, further comprising:
    receiving a subsequent data transmission from the target base station based at least in part on the reset MAC configuration, the reset RLC configuration, the reestablished PDCP configuration, or any combination thereof.

6. The method of claim 5, wherein the second data transmission and the subsequent data transmission use a same RLC/PDCP stack.

7. The method of claim 2, further comprising:
    receiving a third data transmission from the target base station prior to resetting the MAC configuration, resetting the RLC configuration, or reestablishing the PDCP configuration, or any combination thereof.

8. The method of claim 7, wherein the third data transmission is a source base station ciphered transmission.

9. The method of claim 7, wherein the third data transmission corresponds to a same logical channel as the second data transmission from the source base station.

10. The method of claim 1, further comprising:
    determining whether the access procedure was successful, wherein resetting the MAC configuration, resetting the RLC configuration, or reestablishing a PDCP configuration, or any combination thereof, is based at least in part on a determination that the access procedure was successful.

11. The method of claim 10, wherein the determination that the access procedure was successful is based at least in part on receiving a contention resolution message from the target base station.

12. The method of claim 1, further comprising:
    suppressing a radio link monitoring (RLM) procedure based at least in part on receiving the connection reconfiguration message;
    determining whether the access procedure was successful; and
    resuming the RLM procedure with the source base station based at least in part on a determination that the access procedure was unsuccessful.

13. The method of claim 1, further comprising:
    suppressing a radio link monitoring (RLM) procedure based at least in part on receiving the connection reconfiguration message;
    determining whether the access procedure was successful; and
    resuming the RLM procedure with the target base station based at least in part on a determination that the access procedure was successful.

14. The method of claim 1, further comprising:
determining whether the access procedure was successful;
purging the connection reconfiguration message based at least in part on a determination that the access procedure was unsuccessful; and
continuing communication with the source base station.

15. A method of wireless communication at a target base station, comprising:
performing an access procedure with a user equipment (UE) based at least in part on a connection reconfiguration message associated with a handover of the UE from a source base station to the target base station, wherein the UE is capable of receiving data transmissions from the source base station after receiving the connection reconfiguration message, wherein the UE has a medium access control (MAC) configuration, a radio link control (RLC) configuration, and a packet data convergence protocol (PDCP) configuration associated with the source base station; and
transmitting, to the UE, a trigger to stop data transmissions with the source base station, wherein the MAC configuration of the UE is maintained prior to stopping the data transmissions with the source base station.

16. The method of claim 15, transmitting the trigger to stop data transmissions with the source base station further comprises:
transmitting, to the UE, a contention resolution message indicating that the access procedure was successful.

17. The method of claim 15, further comprising:
receiving, from the source base station, an indication of a dual link handover capability of the UE, wherein performing the access procedure is based at least in part on the indication.

18. An apparatus for wireless communication for a user equipment (UE), comprising:
means for receiving, by the UE, a first data transmission from a source base station, the UE having a medium access control (MAC) configuration, a radio link control (RLC) configuration, and a packet data convergence protocol (PDCP) configuration;
means for receiving a connection reconfiguration message associated with a handover from the source base station to a target base station;
means for performing an access procedure with the target base station based at least in part on receiving the connection reconfiguration message, wherein the UE is capable of receiving data transmissions from the source base station after receiving the connection reconfiguration message; and
means for resetting the MAC configuration, resetting the RLC configuration, or reestablishing the PDCP configuration, or any combination thereof, based at least in part on performing the access procedure.

19. The apparatus of claim 18, further comprising:
means for receiving a second data transmission from the source base station after receiving the connection reconfiguration message.

20. The apparatus of claim 19, further comprising:
means for transmitting an indication of a dual link handover capability to the source base station, wherein the second data transmission is received based at least in part on the indication.

21. The apparatus of claim 20, wherein the dual link handover capability is associated with a low latency capability.

22. The apparatus of claim 19, further comprising:
means for receiving a subsequent data transmission from the target base station based at least in part on the reset MAC configuration, the reset RLC configuration, the reestablished PDCP configuration, or any combination thereof.

23. The apparatus of claim 22, wherein the second data transmission and the subsequent data transmission use a same RLC/PDCP stack.

24. The apparatus of claim 19, further comprising:
means for receiving a third data transmission from the target base station prior to resetting the MAC configuration, resetting the RLC configuration, or reestablishing the PDCP configuration, or any combination thereof.

25. The apparatus of claim 24, wherein the third data transmission is a source base station ciphered transmission.

26. The apparatus of claim 18, further comprising:
means for determining whether the access procedure was successful, wherein resetting the MAC configuration, resetting the RLC configuration, or reestablishing a PDCP configuration, or any combination thereof, is based at least in part on a determination that the access procedure was successful.

27. The apparatus of claim 26, wherein the determination that the access procedure was successful is based at least in part on receiving a contention resolution message from the target base station.

28. An apparatus for wireless communication at a target base station, comprising:
means for performing an access procedure with a user equipment (UE) based at least in part on a connection reconfiguration message associated with a handover of the UE from a source base station to the target base station, wherein the UE is capable of receiving data transmissions from the source base station after receiving the connection reconfiguration message, wherein the UE has a medium access control (MAC) configuration, a radio link control (RLC) configuration, and a packet data convergence protocol (PDCP) configuration associated with the source base station; and
means for transmitting, to the UE, a trigger to stop data transmissions with the source base station, wherein the MAC configuration of the UE is maintained prior to stopping the data transmissions with the source base station.

29. The apparatus of claim 28, wherein the means for transmitting the trigger to stop data transmissions with the source base station further comprises:
means for transmitting, to the UE, a contention resolution message indicating that the access procedure was successful.

30. The apparatus of claim 28, further comprising:
means for receiving, from the source base station, an indication of a dual link handover capability of the UE, wherein performing the access procedure is based at least in part on the indication.

* * * * *